United States Patent [19]
Herrmann et al.

[11] Patent Number: 5,737,536
[45] Date of Patent: Apr. 7, 1998

[54] SYSTEM AND METHODS FOR OPTIMIZED ACCESS IN A MULTI-USER ENVIRONMENT

[75] Inventors: Conrad Herrmann, Soquel; Randolph T. Solton, Berkeley; Raymond Shigeru Kiuchi, Santa Cruz, all of Calif.

[73] Assignee: Borland International, Inc., Scotts Valley, Calif.

[21] Appl. No.: 554,328

[22] Filed: Nov. 2, 1995

Related U.S. Application Data

[63] Continuation-in-part of Ser. No. 96,796, Jul. 23, 1993, Pat. No. 5,493,728, which is a continuation-in-part of Ser. No. 19,799, Feb. 19, 1993, Pat. No. 5,446,840.

[51] Int. Cl.$^6$ ............................................. G06F 9/00
[52] U.S. Cl. .......................... 395/200.59; 395/200.47; 711/141
[58] Field of Search ................ 395/200.1, 200.01, 395/200.09, 468, 200.5, 200.3, 200.47, 200.59; 711/141

[56] References Cited

U.S. PATENT DOCUMENTS

| | | | |
|---|---|---|---|
| 4,594,656 | 6/1986 | Moffett | 395/425 |
| 4,714,996 | 12/1987 | Gladney et al. | 395/600 |
| 4,887,204 | 12/1989 | Johnson et al. | 364/283.1 |
| 4,897,781 | 1/1990 | Chang et al. | 364/222.81 |
| 5,113,519 | 5/1992 | Johnson et al. | 395/600 |
| 5,133,075 | 7/1992 | Risch | 395/800 |
| 5,151,989 | 9/1992 | Johnson et al. | 395/600 |
| 5,265,235 | 11/1993 | Sindhu et al. | 395/425 |
| 5,434,994 | 7/1995 | Shaheen et al. | 395/500 |
| 5,493,728 | 2/1996 | Solton et al. | 395/250 |
| 5,581,704 | 12/1996 | Barbara et al. | 395/200.09 |
| 5,603,019 | 2/1997 | Kish | 395/621 |

FOREIGN PATENT DOCUMENTS

WO 91/03024  3/1991  European Pat. Off. .

OTHER PUBLICATIONS

Data base recovery in shared disks and client-server architectures by Mohan et al., 1992 IEEE, pp. 310-317, 1992.
Code: A highly available file system for a distributed workstation environment by Satyanarayanan et al., 1990 IEEE, pp. 447-459, 1990.
Log-based directory resolution in the Coda file system by Kumar et al., 1993 IEEE, pp. 202-213, 1993.
Ownership-based cache consistency model in a distributed file system by Hong et al., 1993 IEEE, pp. 161-164, 1993.
*Updating Software and Configuration Data in a Distributed Communication Network*, by Carl W. Symborski, IEEE 1988 publication, pp. 331-338.

*Primary Examiner*—Krisna Lim
*Assistant Examiner*—Zarni Maung
*Attorney, Agent, or Firm*—John A. Smart

[57] ABSTRACT

A client/server system providing methods of utilizing information stored locally on a client even after the client has modified data on the server is described. A client stores data from the server in a local "read-only" buffer(s), to speed up access to the data and reduce network traffic. Since the buffer is treated as a "read only" buffer, no locks are taken out at the server by the client. Accesses to particular data records are satisfied by looking first to the local buffer or cache. The client may proceed to modify the data records and commit changes back to the server. Moreover, the client updates or "writes through" the "read-only" buffer(s) with the changes so that the local buffer remains valid. The methods of updating data stored locally on the client provide significant performance increases as the client does not have to refresh data from the server.

19 Claims, 9 Drawing Sheets

SYSTEM AND METHODS FOR OPTIMIZED ACCESS IN A MULTI-USER ENVIRONMENT

The present application is a continuation-in-part of application Ser. No. 08/096,796, filed Jul. 23, 1993, now U.S. Pat. No. 5,493,728, which is a continuation-in-part of application Ser. No. 08/019,799, filed Feb. 19, 1993, now U.S. Pat. No. 5,446,840; the disclosures of each are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to data processing environments and, more particularly, to systems for accessing shared information and other resources, such as in a multi-user database system.

Computers are a powerful tool for the acquisition and processing of information. Computerized databases, which can be regarded as a kind of electronic filing cabinet or repository for collecting computerized data files, are particularly adept at processing vast amounts of information. As such, these systems serve to maintain information in database files or tables and make that information available on demand.

Between the actual physical database itself (i.e., the data actually stored on a storage device) and the users of the system, a database management system or DBMS is provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

Of particular interest to the present invention are those information processing systems which are operative in a shared fashion, i.e., by multiple users (or multiple processes) at a given time. A multi-user database implemented on a client/server platform is one such system. Typically, information sharing or connectivity between the users is provided by a computer network, which comprises several computers connected together as a group. At least one of the computers functions as a "server," providing network services to "clients" (other computers) connected to the network. In this manner, valuable information and resources, including programs, information tables, memory, disk space, printers, and the like, may be shared by several users.

In a multi-user environment, availability of current information to each user is an important consideration. To achieve this, these systems store data objects to be shared (e.g., records of a database file) at a single (logical) location, typically resident on the server. Each user receives access to this centrally-stored information by commanding processes which issue requests to the server for retrieving information of interest. Once received at the client computer, this information may be modified by the client's user and then posted back to the server.

Inherent in any multi-user computing system is a basic conflict between data integrity and concurrency, i.e., the need to let many users access the same data simultaneously. Specifically, the potential exists for one user to update a record thereby causing another user to now have an out-of-date version of that same record (i.e., a local copy of the record which does not reflect the update). Suppose, for example, that two users are both executing an application that reads a particular value from a database, performs a calculation on the value, and writes a new value back to the database. If this process begins concurrently, both users will read the same database value, e.g., three. Suppose the calculation is to increment the database value by one. After both users have finished, the new value stored in the database will be four. However, the correct value desired is five, since each of the two is intended to add one to the value of three. The concurrent actions of the two processes have interfered, thus leaving incorrect data in the database. Further safeguards are needed to avoid inconsistent versions of information records.

As one approach to ensuring data integrity, a system could allow only one user to use a particular data record at any given time. As this would be highly inconvenient to other users, it is an unacceptable approach. At the other extreme, the system could allow anyone on a network to use any record at any time. Such unrestricted access, however, would quickly lead to inconsistencies in the data, such as in the example above. Since the need for insuring data integrity must be balanced with the need to provide concurrent access, an important issue in designing any multi-user application therefore is deciding how to resolve simultaneous requests for the same data. And the need for concurrency control is perhaps most acute in a multi-user database system, where information is frequently or even constantly being updated by several users.

The most common mechanism employed for coordinating processes and controlling access to shared data objects is "locking." In its simplest form, locking an object, such as a database record, prevents other processes or transactions from accessing that object (or portion thereof) until the lock is released. This prevents one user or process from updating a data object which is currently being used by another.

An additional benefit is available to the holder of a lock. Since the lock guarantees that the information will not change (i.e., be modified by others), the lock holder may cache the accessed information in a local buffer, thereby avoiding repeated data access across notoriously slow computer networks. In typical data access operation, for instance, numerous messages must be transmitted between a server and its often numerous clients. For example, messages are required for file operation (e.g., opening, reading, writing, closing, and the like) as well as lock management (e.g., set lock and release lock). With a lock in place for an object, however, the information of interest can be stored locally (cached) by the lock holder, since the lock guarantees that the object will not be changed by others.

Of course the touchstone of a multi-user environment is sharing. No one user or process can be given access to a given object for long periods of time to the exclusion of others. A lock must, therefore, be held for short periods of time, or at least be relinquished when others require access. The ability to cache data locally is therefore limited by the need of others to access the same information.

If this need to share a particular object is not great, however, then a lock may be applied to the object and a copy of that object may be cached locally. Such an approach is described in METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. Making the assumption that it is common for only a single user to be using a network at any one time, that system employs the notion of "opportunistic" locks. The first client to request access to an object is given opportunistic (qualified) exclusive access to that object; a copy of the object may be cached locally in the client. If another client also requests access, the first client relinquishes its exclusive access, with the corresponding opportunistic exclusive lock held by the first client also being lifted. Upon removal of its exclusive lock, however, the client can no longer rely on its cached copy of the information—others may now post changes to that very same information.

The foregoing approach has distinct limitations which limits its usefulness. First, the assumption that only a single user is using a network at any one time is becoming increasingly difficult to make. Early on in their history, networks were simply an adjunct to PCs, largely for printer sharing. Their capacity largely went unutilized. Today, however, networks form the backbone of corporate computing, as more and more companies are moving their data off mainframes and onto networks. Therefore, a more valid assumption would be that many users are using a network at any one time; the contention for a particular data object may in fact be quite high. In the above-described system, therefore, it is quite likely that opportunistic locks would have to be frequently relinquished, thus making the technique largely ineffective (or even counter-productive). Second, the approach requires the server to know the status of each client's context and to act accordingly. This interdependency of each client with the server (e.g., for receiving a command to relinquish an exclusive lock) is not desirable in today's heterogenous network environments.

In addition to the problem of maintaining data integrity in a multi-user shared data environment, there remains the problem of efficient utilization of a client's local buffers. A local buffer or cache is generally employed to store one or more blocks of records likely to be required by a particular client. By employing a local buffer, the client need not repeatedly retrieve data records from the server, as they are already available locally in memory. The cache is particularly useful, for instance, when "browsing" records (i.e., viewing blocks of records).

As soon as a record is read by a client from a server, it is possible that the client's copy of that record might be "stale." Here, the record at the server might change as a result of another client posting a modification to the record. Although the client might "lock" the record to ensure that it is not modified, such an approach would block all other clients while the first client is reading the record. A common approach to reading records, therefore, is to provide clients with a "dirty" read but a "clean" (safe) write. Here, a "dirty" read means that once a client has read the data, another client may change it (at the server). It is possible, therefore, that at least some of the data records being viewed by the first client might in fact be stale. In other words, it is possible that at least one of the records might have been modified at the server by another client, while the first client is viewing a cached version of those records.

The "dirty read" approach recognizes that many reading operations do not require that the data be the absolutely latest version. For instance, a user running a weekly report generally does not need the absolute latest information. Here, the client may maintain a buffer in its local memory that stores data from the server for read-only purposes. Since a lock is not taken out by the client, the approach provides fast reads. To offset the possibility of stale data, various mechanisms (including those provided by the present invention) may be utilized to "refresh" the local buffers.

When a modified data record is written back to the server, a lock is taken out, thereby providing the "clean" or "safe" write. At the server, database records are typically stored in pages or blocks, where a single block may contain multiple records. In database operations, therefore, data modifications to a record correspond to updating the record in the associated block stored on a server. As described above, an updating client employs a lock or some other data-integrity mechanism to obtain exclusive access to the record at the server which the client is posting the modification. In typical operation, the client requests a lock on the data record (or data page/block) at the server which is to be modified. The lock prevents another client from updating the data concurrently. After receiving the lock (i.e., exclusive access), the client can post a modification to the data record at the server with the assurance that it has exclusive access to the record (i.e., to the exclusion of other clients) for posting the modification. After the client posts or "commits" the modification of the data, the client relinquishes the lock.

In the dirty read/clean write approach, a problem arises when the client desires to modify the data stored on the server which is also cached locally. Upon the client posting the modified record to the server, any local buffer that stores the record data is rendered stale. At this point, prior art systems simply "throw away" the cache (i.e., invalidate it), thus requiring that the local buffer be refreshed from the server, before it is utilized again.

In addition to invalidating or throwing away the cache at this point, prior art systems invalidate other useful structures. One such structure is a conventional query bit map which stores bits indicating whether each record in the database satisfies a particular query expression. For example, a bit map may contain a "1" for each record that meets a query condition, such as a condition specifying all customers who live in California. If a record does not meet the filter or query condition, the corresponding bit in the bit map is set to "0." When a client updates a record in the database, the bit map may no longer be accurate. For example, if a client changes the address of a customer from California to New York, a bit map of customers living in California is no longer accurate. Again, the prior art approach is to invalidate the bit map, thereby throwing it away. But that approach is problematic in a file server environment. Regenerating a bit map after it has become inaccurate typically involves both substantial processing time and network traffic as the client needs to re-evaluate each record in the database against the query expression.

What is needed are a system with methods which allow clients to optimize disk access by maximizing use of local buffers, all without the need for the server to monitor the status of each client. Optimization of disk access should not decrease the autonomy which has made client/server systems such an attractive model for solving corporate information processing needs. The present invention fulfills this and other needs.

SUMMARY OF THE INVENTION

The present invention includes a multi-user computer system having a server connected through a network to one or more workstations or "clients." This client/server system allows system resources and data objects, including information residing on a logical storage device, to be shared among several clients concurrently. In a preferred embodiment, the system of the present invention includes a multi-user database management system having shared information. The shared information includes data records stored in information tables residing on a storage device of the server.

The invention includes methods for providing concurrent access to shared data residing on the server, but without the network-communication overhead normally associated with transferring data to the clients. According to the present invention, data transfer operations are performed at a frequency matched to the ability of the client to make use of such information. Since information need only be updated (transferred to a client) about once every two seconds, resource-intensive data transfer operations may be minimized to only those which are really necessary. In all other instances (i.e., time periods when updating is not needed), data access is provided by a local copy of the data stored in a rapid-access memory of the client. By maintaining the data locally, with periodic refreshing, large data transfers to clients are avoided. At the same time, concurrency information (e.g., updates) is provided to clients as fast as it can be effectively assimilated.

In an exemplary embodiment (designed for preemptive or interrupt-based systems), a method for providing a client optimized access to data residing on a server proceeds as follows. First, a buffer is allocated in the memory of the client for storing a local copy of the desired information. Next, the system sets an "invalid" flag for indicating that information stored in the buffer is invalid; that is, the buffer (at this particular point in time) does not hold a valid copy of the desired information. The system then transfers the desired information from the server into the buffer and, in doing so, resets the flag to indicate that the buffer is now valid—a correct copy is stored. At a periodic time interval, one selected to optimize the data transfer characteristics of the network, the invalid flag is set again for marking the buffer as (possibly) invalid. When the information is required, if the system detects that the invalid flag has been tripped, the system transfers the desired information from the server into the buffer and resets the flag (to "valid").

With a copy of the information of interest locally cached, the client may proceed to operate on the copy residing in the rapid-access memory, instead of repeatedly re-reading (transferring) the desired information from the server. The desired information is only re-read from the server when the invalid flag is set.

In another embodiment, the present invention provides methods of utilizing information stored locally on a client even after the client has modified data on the server. According to the present invention, a client stores data from the server in a local "read-only" buffer(s), to speed up access to the data and reduce network traffic. Since the buffer is treated as a "read only" buffer, no locks are taken out at the server by the client. Accesses to particular data records are satisfied by looking first to the local buffer or cache.

The client may proceed to modify the data records and commit changes back to the server. Moreover, according to the present invention, the client updates or "writes through" the "read-only" buffer(s) with the changes so that the local buffer remains valid. In a representative system comprising a computer network having a server for storing information and at least one client that shares the information, the method comprises the steps of: transferring a block of records from the server into the cache memory of the client, modifying one or more records in the block in the memory of the client, transferring the modified block from the client to the server, determining if there is a block buffered in the memory of the client corresponding to the modified block; and updating the buffered block according to the modified block.

In a database environment, a bit map stored locally on a client may be updated after the client has modified the database so that the bit map need not be recalculated or regenerated. In addition to the client updating blocks stored locally on the client after a modification, the client applies the query condition to modified record(s) and updates affected bit maps accordingly. In this manner, the client is able to retain the bit map even after the client has modified data on the server. The methods of updating data stored locally on the client provide significant performance increases as the client does not have to refresh data from the server.

Figure 1A:
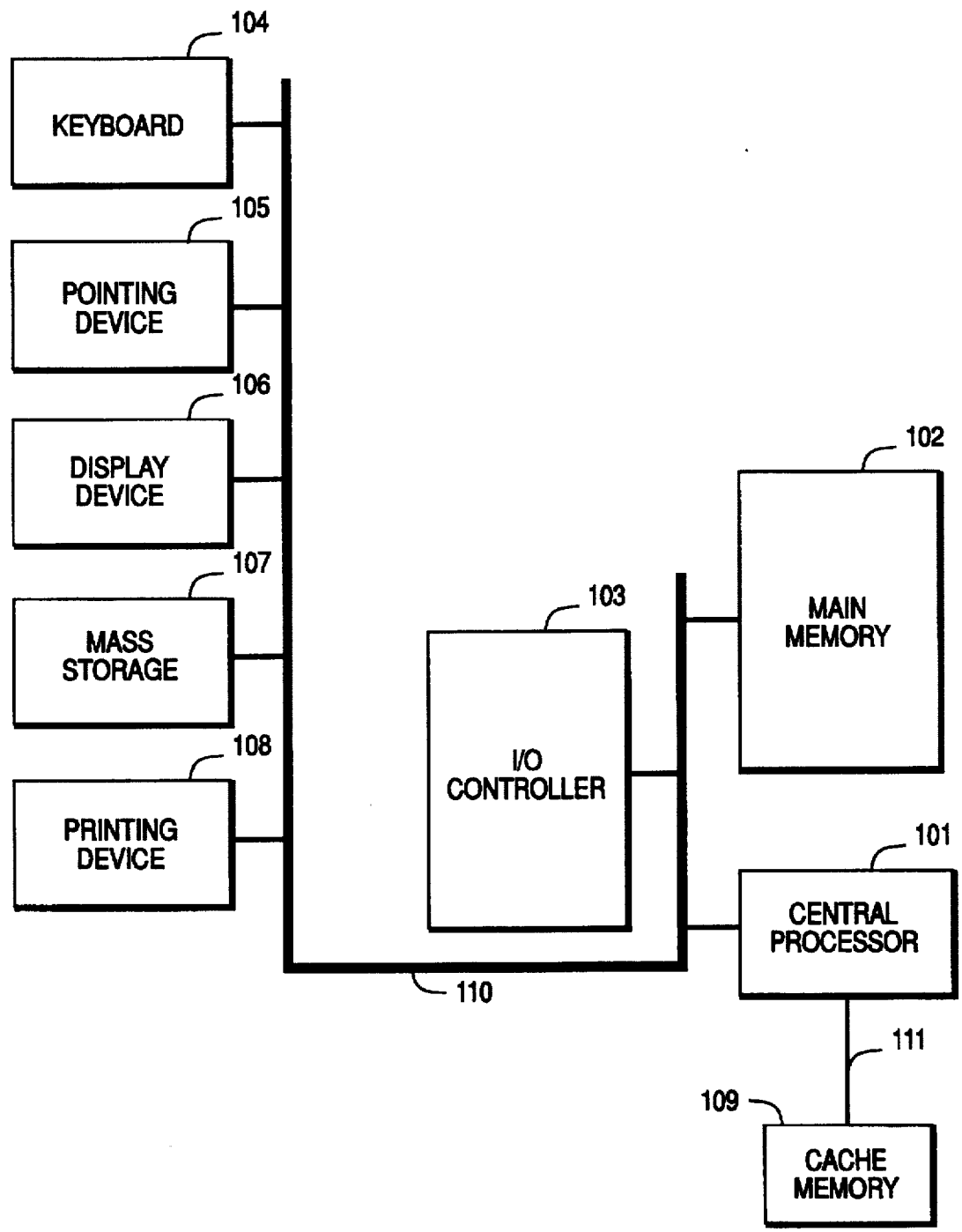
FIG. 1A is a block diagram of a computer system in which the present invention may be embodied.

GLOSSARY access (disk access): To obtain entry to, or to locate, read into memory, and make ready for some operation. Access is used with regard to disks, files, records, and network entry procedures.

allocate: To reserve memory for use by a program. Programs often need certain system resources such as memory or disk space, and they request them as needed from the operating system.

bit map: A data structure including a plurality of bits, each indicating whether a particular data object (e.g., data record) has a certain characteristic. In database operations, a bit map may include a bit for each record in the database, with the bit indicating whether the record satisfies a query expression.

block (storage block): A group of similar things—usually bytes of storage or data. In disk storage, a block is a collection of consecutive bytes of data that are read from or written to the disk as a group.

database: An organized collection of information.

Database Management System (DBMS): System that controls the organization, storage, and retrieval of information in a database.

directory (and subdirectory): A way of organizing and grouping the files on a disk; typically, presented to the user as a catalog for filenames and other directories stored on a disk. What the user views as a directory is supported in the operating system by tables of data, stored on the disk, that contain characteristics associated with each file, as well as the location of the file on the disk.

field: A member of a row that holds a data value associated with an attribute.

file: A file is a conglomeration of instructions, numbers, words, or images stored as a coherent unit which may be operated upon as a unit (e.g., for retrieving, changing, deleting, saving and the like). A disk file is a basic unit of storage that enables a computer to distinguish one set of information from another; typically includes at least one complete collection of information, such as a program, a set of data used by a program, or the like.

file name: A file name is a name assigned for identifying a file.

filter bit map: A bit map used in a database operation to filter records such that only the records having the corresponding bit in the bit map set (or reset) are utilized.

header: Typically the first data in a file, a header stores identity, status, and other data of a file.

index: A stored collection of keys (see below) which facilitate record operations, including searching, inserting, and deleting. Such data structures can include hash tables, binary trees, and B-trees.

input/output: Often abbreviated I/O, input/output refers to the complementary tasks of gathering data for the microprocessor to work with and making the results available to the user through a device such as the display, disk drive, or printer.

location (storage location): The position at which a particular item can be found. A storage location can be an addressed (uniquely numbered) location in memory or it can be a uniquely identified location (sector) on disk.

read (disk read): Read is the operation of receiving input into the computer from a peripheral device, such as a disk. A read is an I/O operation: data is being output from the peripheral device and input into the computer.

referencing: Addressing or otherwise targeting a desired object (e.g., file) at a particular (addressable) location.

resource: Any part of a computer system or network, such as a disk drive, printer, or memory, that can be allotted to a program or a process while it is running.

row/record: Physically, a row is usually a record in a data file. Logically, a row is one horizontal member of a table: a collection of fields.

storage device: Any apparatus for recording information in permanent or semipermanent form. Most commonly refers to a disk drive.

table: A structure that contains information. Usually, a collection of rows all stored in one logical file.

write (disk write): To transfer information either to a storage device, such as a disk, or other output device. A disk write transfers information from memory to storage on disk.

DETAILED DESCRIPTION OF A PREFERRED EMBODIMENT

The following description will focus on embodiment of the present invention in a multi-user database environment. Application of the present invention is particularly advantageous in those environments requiring access to data in a shared fashion, such as in a multi-user or multi-tasking database system. The present invention is, however, not limited to any particular exemplary embodiment. Instead, the teachings of the present invention may be advantageously applied to a variety of architectures. Therefore, the following preferred embodiment and certain alternatives are offered for purposes of illustration and not limitation.

As used herein, the term "database" and "table" refers to any file or collection of files that are used to store information or other data. For example, a spreadsheet file can be considered a database using the present invention. In addition, a database can be a purely virtual object such as data on a remote machine.

General Architecture

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a non-volatile or mass storage 107. Memory 102 includes volatile memory, such as random-access memory or RAM; storage 107 includes non-volatile memory, such as a hard or fixed disk, floppy disk, optical disk, magneto-optical disk, or flash memory. Processor 101, which may be an Intel® 80×86-class microprocessor, includes or is coupled to a cache memory 109 for storing frequently accessed information; memory 109 may be an on-chip cache or external cache (as shown). System 100 may also be provided with additional input/output devices, such as a printing device 108, as desired. The various components of the system 100 communicate through a system bus 110 or similar architecture, as shown.

Figure 1B:
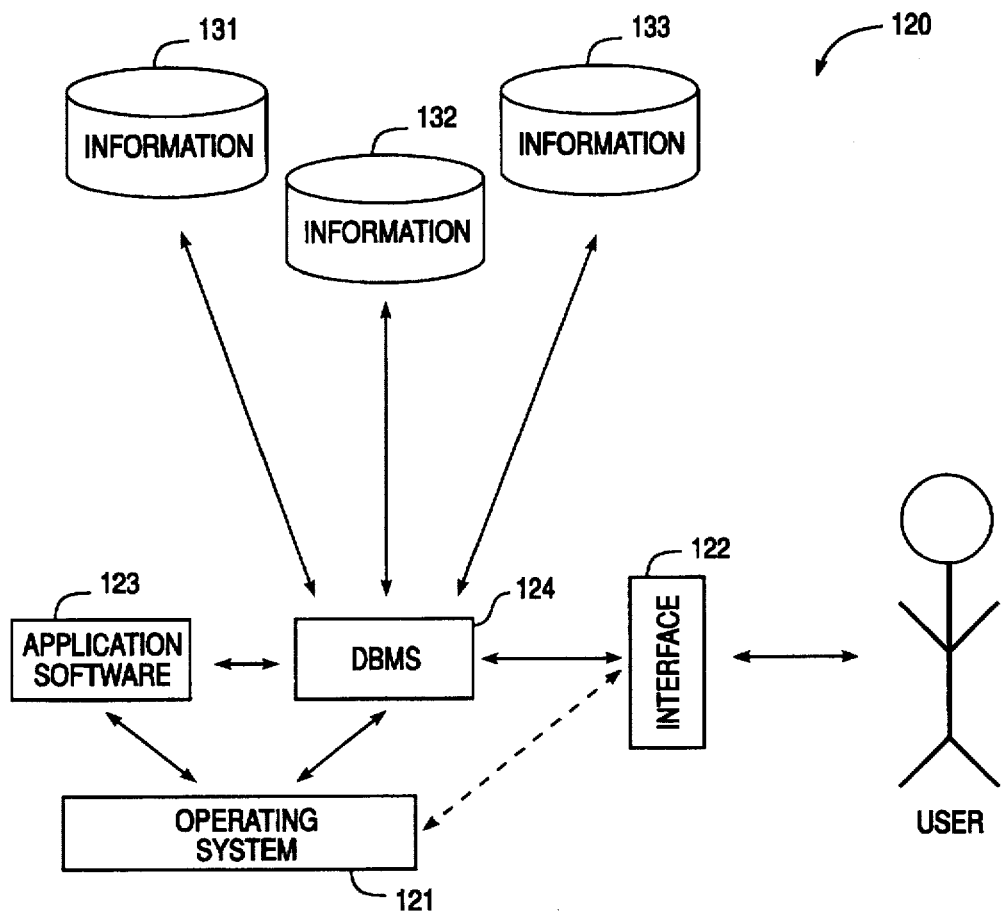
FIG. 1B is a block diagram of a software system, including a database management system (DBMS), which is operative in the computer system of FIG. 1A.

Illustrated in FIG. 1B, a computer software system 120 is provided for programming the operation of the computer system 100. Software system 120, which is stored in system memory 102 and on disk memory 107, includes a kernel or operating system 121 and a DBMS 124. OS 121 is the executive or supervisor for the system 100, directing both task management and data management.

DBMS 124, on the other hand, is a software subsystem for storing, retrieving, and manipulating information in database tables (e.g., tables 131, 132, 133). Under the command of DBMS 124, the system 100 receives user commands and data through user interface 122. Interface 122 may include a built-in query surface or editor for accessing and processing database information. Additional application programs, such as DBMS application software 123, may be "loaded" (i.e., transferred from storage 107 into memory 102) for execution by the system 100, particularly for further controlling the operation of DBMS 124.

In a preferred embodiment, the system 100 is an IBM-compatible personal computer system, available from a variety of vendors (including IBM of Armonk, N.Y.), and operating system 121 is MS-DOS operating system software, available from Microsoft of Redmond, Wash. DBMS 124 preferably includes dBASE IV® (available from Borland International of Scotts Valley, Calif.) which includes dBASE's Command Control and QBE query surface. If desired, other operating systems and/or DBMSs (or alternative configurations thereof) may be employed in accordance with the principles of the present invention. In the most preferred embodiment of the present invention, the system 120 operates in a shared environment, such as in a client/server configuration running in a Local Area Network (LAN) environment (described hereinbelow with reference to FIG. 1D).

Figure 1C:
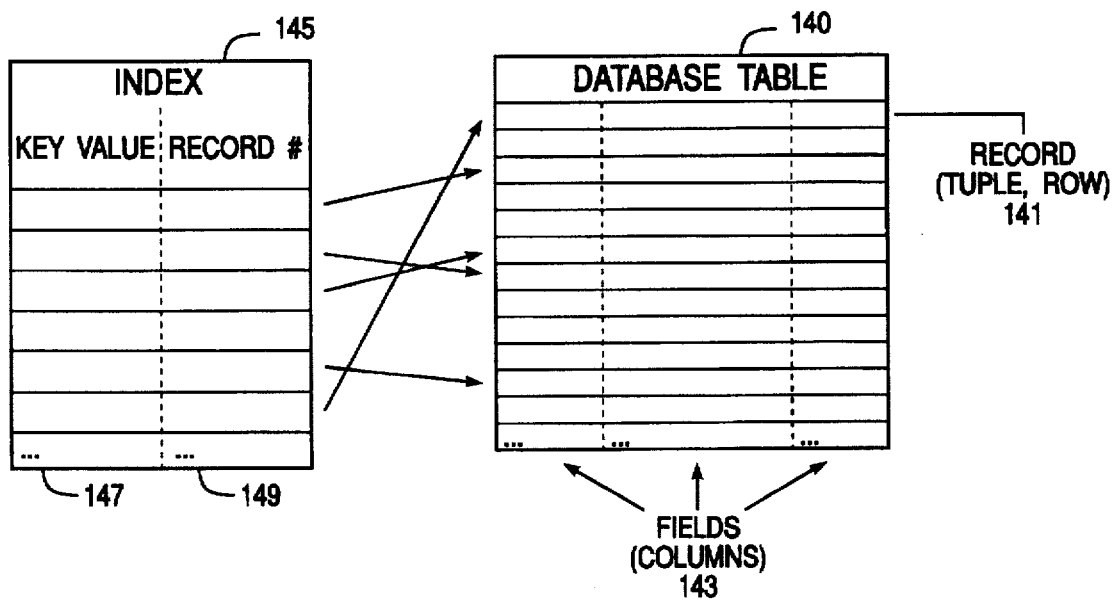
FIG. 1C is a block diagram illustrating a data object, such as database file; an object may have interrelated or dependent data, such as a supporting index.

At the outset, it is helpful to understand general techniques for storing information, such as in DBMS 124. In a database management system, information is conveniently organized into tables, such as table 140 of FIG. 1C. As conceptually shown, table 140 typically includes horizontal rows or records (tuples) 141 and vertical columns or fields 143. A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

A given table may be interrelated to other data objects, including for example index, report, and form files. A database index allows the records of a table to be organized in many different ways, depending on a particular user's needs. As shown by index 145 of FIG. 1C, for example, an index may be constructed as a single disk file which is referred to internally by the system for locating and displaying records in a database file. Index 145 stores index key values 147 and unique record numbers 149. The former is a data quantity composed of one or more fields from a record used to arrange (logically) the database file records by some desired order (index expression); the latter are unique pointers to the actual storage location of each record in the database file.

Network Architecture

Figure 1D:
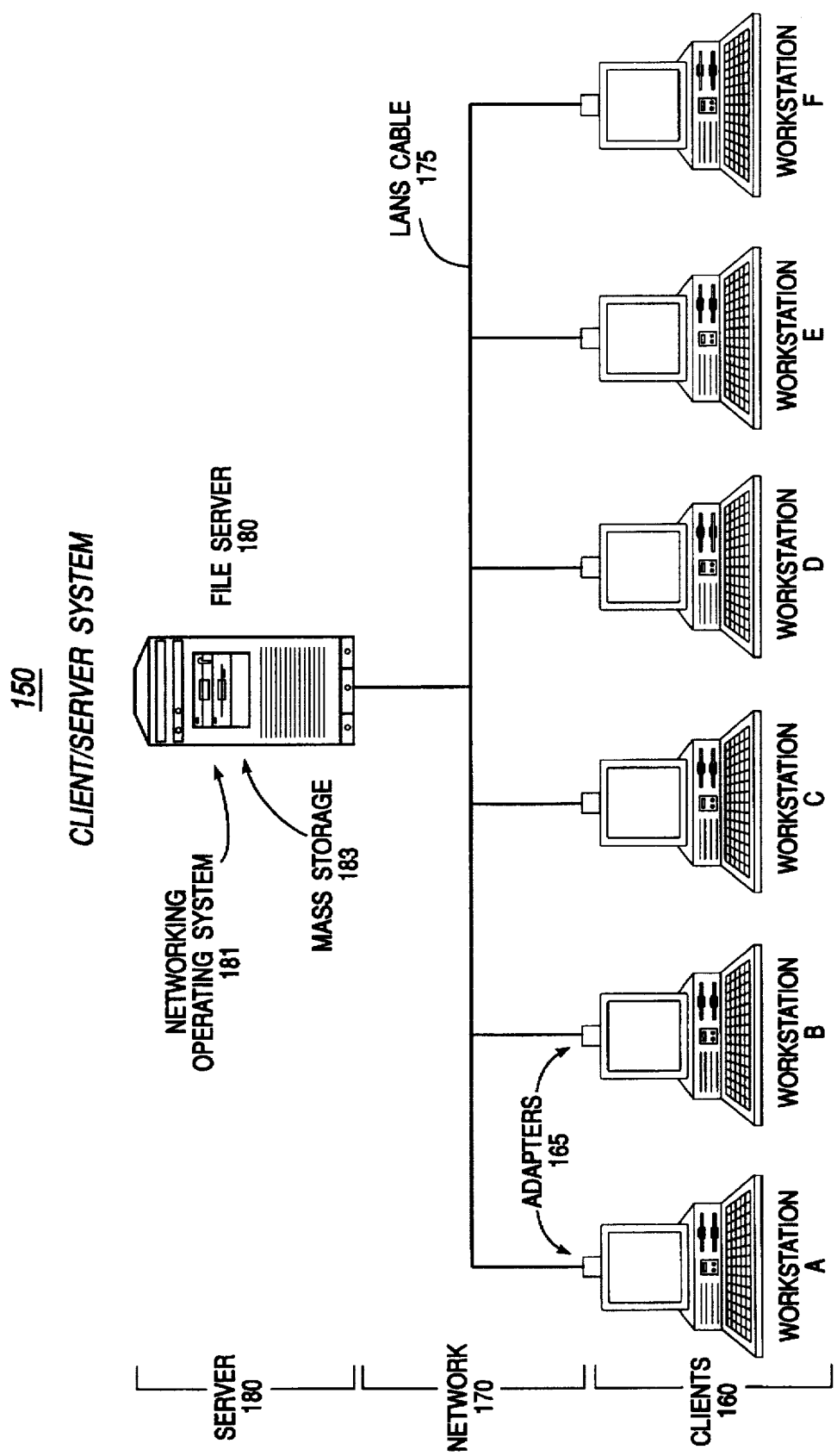
FIG. 1D is a block diagram of a multi-user computing environment, such as a client/server system connected via a Local Area Network (LAN), in which the present invention is most preferably embodied.

While the present invention may operate within a single (standalone) computer (e.g., system 100 of FIG. 1A), the present invention is preferably embodied in a multi-user computer system, such as the client/server system 150 of FIG. 1D which includes system 100. Specifically, system 150 includes a first computer or server 180 and one or more second computers or clients 160. In an exemplary embodiment, the clients or workstations 160 are connected to server 180 through a computer network 170, which may be a conventional Local Area Network (LAN). Network 170 includes cabling or network links 175 for connecting the server and each workstation to the network. The workstations themselves will be similar to or the same as system 100; additionally, each typically includes an adapter 165 for receiving the network cable 175. Server 180 may also be similar to or the same as system 100. Because the server manages multiple resources and objects for the clients, it should preferably include a relatively faster processor, larger mass storage, and more system memory than is found on each workstation.

Overall operation of the system 150 is directed by a networking operating system 181, which may be stored in the server's system memory; in a preferred embodiment, OS 181 includes NetWare®, available from Novell of Provo, Utah. In response to requests from the clients 160, the server 180 provides various network resources and services. For instance, multiple users (e.g., workstations A, B, and C) may view a database table stored in file server storage 183, while another user (e.g., workstation E) sends a document to a network printer (not shown).

The general construction and operation of a computer network has been well documented in the technical, trade, and patent literature. For a general introduction to a Local Area Network operating under NetWare, see Freed, L. et al., *PC Magazine Guide to Using NetWare*, Ziff-Davis Press, 1991. A more detailed discussion is available in NetWare and accompanying documentation, which is available from Novell of Provo, Utah. For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. The disclosures of each of the foregoing is hereby incorporated by reference.

Multi-user Database Operation

Of particular interest to the present invention is use of system 150 for multi-user database access which will now be described. To an end user, using the DBMS of the present invention in a networking environment is much like using it as a standalone program on a single computer (e.g., system 100). On a network, however, resources and data objects may be shared with other users, with two or more users often working with the same resource or object simultaneously. Not unexpectedly, a given network's rules for file-sharing (i.e., trustee assignments of directories and files) come into play. For instance, a user cannot change a table if he or she does not have sufficient network rights to the directory the table resides in. Despite these restrictions, network operations remain, for the most part, transparent to an end user.

According to the present invention, database objects (e.g., tables, forms, reports, and the like) are locked by system 150 when necessary to ensure data integrity and consistency. Locks temporarily restrict other users from accessing an object while the user (lock holder) is using it. Typically, these sharable objects will be stored in at least one shared directory (e.g., on storage 183).

The system of the present invention provides for both automatic and explicit placement of locks. For instance, each record is automatically locked when a user begins to edit it and unlocked when the user leaves the record. Alternatively, each user (typically, a developer-user) can explicitly lock an object, thus allowing one to maintain complete control over the access of others to tables he or she is sharing.

Methods for optimized data access

A. Preemptive (interrupt-based) embodiment

Figure 2A:
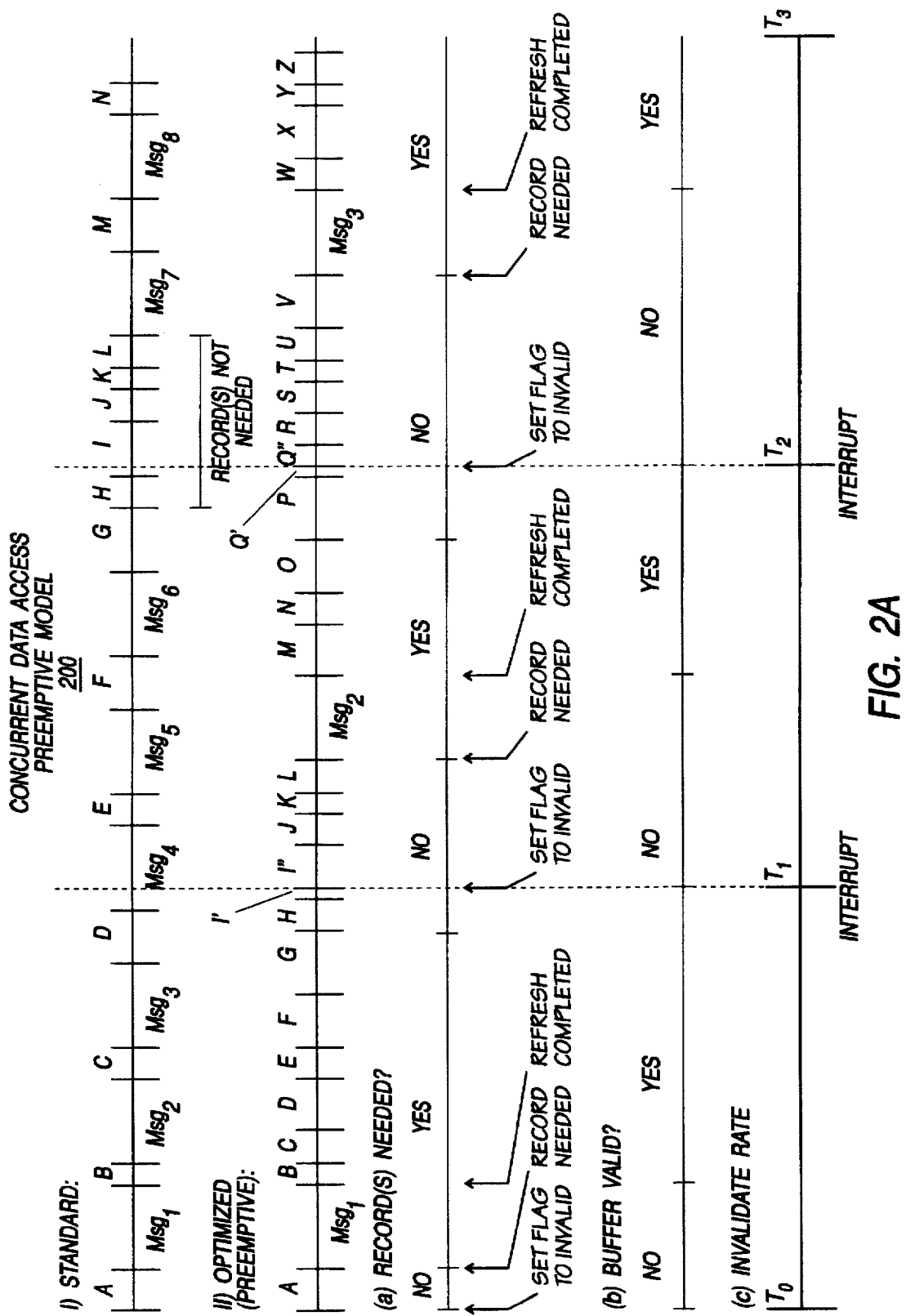
FIG. 2A is a timing diagram illustrating an optimized data access method of the present invention, operative in a preemptive (interrupt-based) model.
Figure 2B:
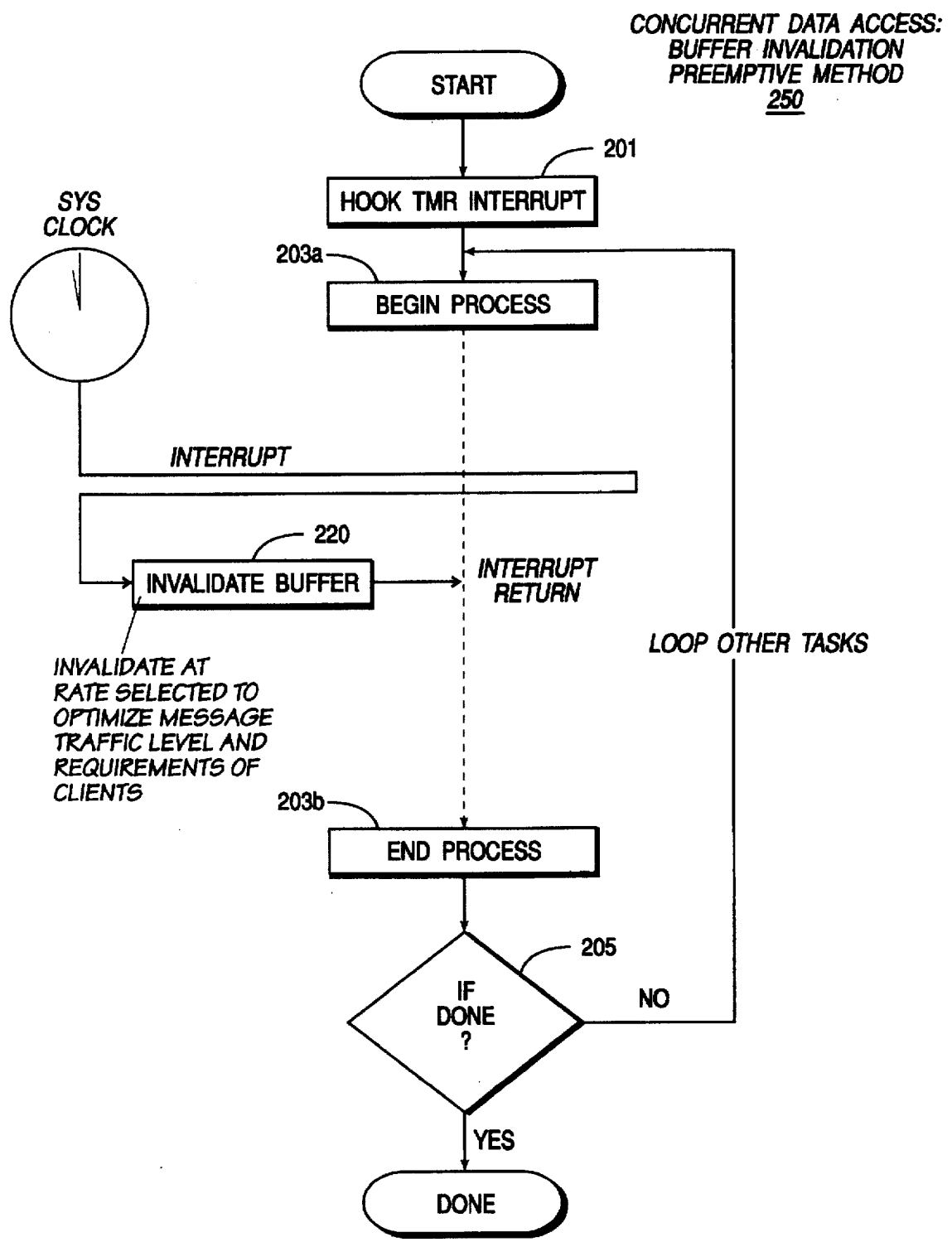
FIG. 2B is a flowchart illustrating the general operation of the optimized data access method (of FIG. 2A).
Figure 2C:
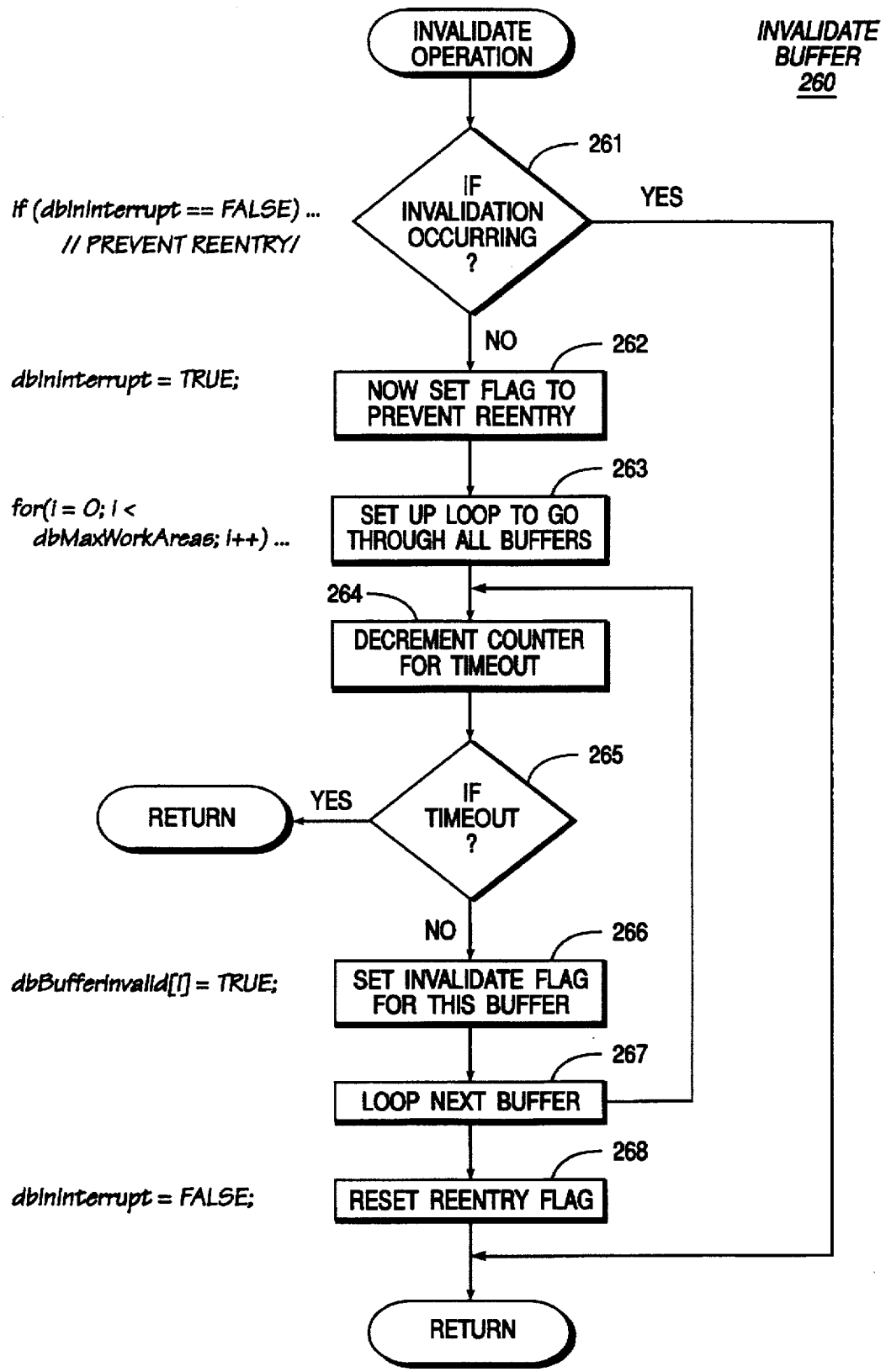
FIG. 2C is a flowchart illustrating steps of refreshing a local memory buffer which occur during the optimized data access method (of FIG. 2B).

Referring now to FIGS. 2A–C, a method of the present invention for optimized multi-user access will be described. At the outset, it is helpful to review conventional methodology for data access in a computer network environment, as shown by tracing I of FIG. 2A. From that foundation, the teachings of the present invention may be better understood.

Tracing I represents a series of processes or tasks executed by the processor 101 over a finite period of time. In operation, processor 101 receives a sequence of instructions (i.e., "machine instructions") encoded in the form of a sequence of bytes from one or more logically defined areas (code segments) of the memory 102. In typical data processing operation, a specific sequence of instructions are provided to accomplish a given task. These are represented in tracing I by the uppercase letters (e.g., A–N). These tasks, which are being performed by the processor 101, may be any one of the numerous applications which lends itself to modeling on a digital computer. Examples include such diverse applications as word processing, a database "join" operation, a spreadsheet recalculation operation, and so forth. As each task is comprised of a plurality of machine instructions and each machine instruction, in turn, requires one or more system clock cycles within which to operate, each defined task requires an interval of time or "time slice" within which to complete.

Machine instructions or simply "code" usually operate on data objects or structures. A series of instructions for sorting a database table, for instance, would require access to the data structures which represent the table, namely the individual records which comprise the table. And these data may be quite numerous and/or large. Customer information for a medium-sized company, for instance, can easily require megabytes of storage space. To process data (e.g., database records) which are required by a given task, a mechanism must be provided for giving the processor access to the data.

As shown in tracing I, interjected between those times which the processor is performing a particular task are intervals of time required for data access operations. As is well known in the art, the time required for accessing a data object of interest varies widely. On the one hand, data present in a register of the processor may be quickly accessed, on the order of nanoseconds. On the other hand, data which must be read from a disk storage device has a much slower access time; twenty milliseconds is typical. More problematic is data resident on a server operating in a computer network. As several users (clients) may be simultaneously employing the services of the network, data access may be particularly slow.

Represented by $Msg_n$, time intervals, data access across a computer network occupies a significant if not substantial portion of a processor's time (which must wait for the required data item to arrive). For file intensive applications, such as sequentially processing records of a database table, a good portion of a processor's time will be spent waiting for data to arrive. The phenomenon of "network bottleneck" is a well known one.

Standard methodology for accessing data objects is not only resource intensive but is also wasteful. In particular, network resources are wasted updating or reading information records at a rate which exceeds the usefulness of such updates to the clients. In tracing I, for instance, three read operations ($Msg_1$–$Msg_3$) are performed in a time period ($T_0$–$T_1$) which exceeds the usefulness of such information to the client. In other words, effort has been expended updating the local buffer of the client at a rate which exceeds the ability of the client to process such updates.

With reference to tracing II, a preferred method of the present invention for optimized data access in the computer network 150 will now be described. Since the local buffer need only be updated at a rate no greater than needed for processing, the slow task of retrieving information across a network may be minimized to only those instances which are really necessary. As shown by tracing II, the local buffer is updated a maximum of only once per a predefined frame-rate time interval. In the time interval from $T_0$ to $T_3$, for instance, only three buffer refresh operations are needed: $Msg_1$–$Msg_3$. Additional refreshing of the buffer is not necessary and is in fact wasteful of system resources.

As shown in the first time interval ($T_0$–$T_1$) of tracing II, a buffer refresh operation is only performed a maximum of once ($Msg_1$) during the interval. At all other times during the interval, the various system processes which may be executing (e.g., tasks A–I) access the copy of the data stored in the local buffer which is maintained in an allocated section of memory 102 (or in dedicated cache memory 109). Data accesses to the local memory execute substantially faster than ones to data residing on the file server; further cache optimization may be added as desired. By maintaining a local buffer in rapid access memory, the penalty incurred with large data transfers across a network is avoided. By periodically refreshing the buffer, concurrency is maintained.

In operation, the local buffer is "invalidated" at the preselected time interval. Specifically at this point, a flag is set for indicating that the contents stored in the buffer can no longer be assumed to be valid. The preselected time interval may be empirically selected to match the data transfer characteristics of the network with the data processing capabilities of the clients. The buffer is not refreshed during those time intervals when access to data is not required by a currently-executing process. In other words, an invalid buffer is next refreshed (data re-read) when only a process requests access to the data in the buffer.

As shown, the optimized data access method of FIG. 2A is preemptive or interrupt-based in nature. Specifically, at predefined time intervals, system processes are interrupted so that the buffer may be invalidated. An "interrupt" is a special type of instruction which causes the processor 101 to halt the execution of the current program, save the current state of the system on stack memory (maintained in memory 102), and jump to an appropriate interrupt-handling routine (specified by the number of the interrupt). After the interrupt routine has finished, it performs an "interrupt return", which causes the previously executing program to resume.

Two basic types of interrupts exist: those generated by hardware and those caused by software. A hardware interrupt is typically generated by some system element outside the control of the executing program. Examples include a key press, a character arriving at a serial port, a tick of the system clock, and the like. A software interrupt, on the other hand, is generated on purpose by the running program. Intel 80×86 CPUs (e.g., CPU 101) allow a program to execute a software interrupt via the INT machine instruction. The number that follows the instruction determines the number of the interrupt and serves as an index into an interrupt vector table whereby the appropriate interrupt handler (routine) may be invoked. The great majority of software interrupts employ INT 21h, which is the gateway to MS-DOS services, and INT 10h for ROM BIOS video services.

Of particular interest to the present invention are periodic hardware interrupts. AT-compatible computers, for instance, include a Motorola MC 146818 real-time clock (RTC) chip (or functional equivalent) which provides the system with a real-time clock. The RTC chip includes the added capability of generating a periodic hardware interrupt at a program-specified frequency or time, which can be programmed to occur at frequencies ranging from 2 hertz to 8.192 kilohertz. By setting various status bits in the chip, for instance, the following periodic interrupt rates may be obtained:

TABLE 1

| RS Bits | | | | Periodic | Ticks/ |
|---|---|---|---|---|---|
| 3 | 2 | 1 | 0 | Rate | Second |
| 0 | 0 | 0 | 0 | None | None |
| 0 | 0 | 0 | 1 | 3.90625 ms | 256 |
| 0 | 0 | 1 | 0 | 7.8125 ms | 128 |
| 0 | 0 | 1 | 1 | 122.070 µs | 8,192 |
| 0 | 1 | 0 | 0 | 244.141 µs | 4,096 |
| 0 | 1 | 0 | 1 | 488.281 µs | 2,048 |

TABLE 1-continued

| RS Bits | | | | Periodic | Ticks/ |
| --- | --- | --- | --- | --- | --- |
| 3 | 2 | 1 | 0 | Rate | Second |
| 0 | 1 | 1 | 0 | 976.562 μs | 1,024 (default) |
| 0 | 1 | 1 | 1 | 1.93125 ms | 512 |
| 1 | 0 | 0 | 0 | 3.90625 ms | 512 |
| 1 | 0 | 0 | 0 | 3.90625 ms | 256 |
| 1 | 0 | 0 | 1 | 7.8125 ms | 128 |
| 1 | 0 | 1 | 0 | 15.625 ms | 64 |
| 1 | 0 | 1 | 1 | 31.25 ms | 32 |
| 1 | 1 | 0 | 0 | 62.50 ms | 16 |
| 1 | 1 | 0 | 1 | 125 ms | 8 |
| 1 | 1 | 1 | 0 | 250 ms | 4 |
| 1 | 1 | 1 | 1 | 500 ms | 2 |

To the timer interrupt, one may attach an interrupt service routine (ISR) for "servicing" (performing a desired task) in response to occurrence of the interrupt. In this fashion, a periodic interrupt may be generated at a rate selected to correspond with a desired frame rate. The use of system clocks for generating time-based interrupts is well documented in the technical, trade, and patent literature. See e.g., Mischel, J., The AT Real-Time Clock, *PC Techniques*, June/July 1992, pp. 25–36, the disclosure of which is hereby incorporated by reference.

Referring now to FIG. 2B, the method of the present invention for providing optimized concurrent data access in a preemptive (interrupt-based) system is summarized by a flowchart 250. The steps are as follows. First, in step 201, a periodic timer is established, for example, by hooking into an available timer interrupt. The specific procedure for accomplishing this will vary from one hardware platform to another; those skilled in the art, however, will appreciate the functional equivalent of this step for their target system. One should select an interval sufficiently short in duration to achieve a frame rate at or above the above-mentioned read (message) rate, typically on the order of about 1–4 seconds per frame. For particular applications, slower rates may still give acceptable results.

After the interrupt interval is established, the system may proceed to perform one or more operations of interest. Step 203 (203a–203b) represents (conceptually) the performance of a particular task or process by the system (e.g., modifying fields of a database record). As shown, the process is interrupted at the preset interval, whereupon a buffer invalidate operation, step 220, is performed. The process can be any sequence of processor instructions. There is no requirement that the task itself be time-based (in contrast to, say, real-time multimedia processes). The only requirement is that the process is one capable of being interrupted in response to occurrence of the interrupt which has been enabled in step 201. Of course to benefit from the method of the present invention, at least some data access should be contemplated by at least one of the processes to be performed.

Once the interrupt service step 220 concludes (interrupt return), control is returned to the executing process of step 203. Step 205 (although shown conceptually as a loop) simply indicates that other processes of the program are undertaken in a similar fashion (i.e., normal operation with periodic strobes of image memory to video memory). Upon completion of all processes (yes at step 205), the method concludes (and typically returns control to the operating system).

Referring now to FIG. 2C, a method 260 of invalidating a buffer in accordance with the present invention is illustrated by a flowchart. The steps are as follows. At step 261, the method determines if an invalidate operation is already occurring. Since the time-based interrupt occurs at defined intervals, it is preferable to include step 261 to prevent unnecessary reentry. Thus, if an invalidation is already occurring (yes at step 261), then the method 260 simply returns (for this particular invocation). Otherwise (no at step 261), the method proceeds to step 262 to now set the invalidation reentry flag to true. At step 263, a loop is established to process each of the one or more buffers that may be active.

The method includes a "timeout"—an upper time limit which will be spent performing the steps of the method. Thus, at step 264, a counter is decremented for keeping track of the time which has been spent within the method. At step 265, the counter is examined to make sure time remains. If a timeout occurs (i.e., count equal to 0), the method concludes. If a timeout has not occurred, however, the method proceeds to step 266 to set an invalidate flag for the buffer (i.e., the current buffer being processed in this loop) to "invalid." At step 267, the method loops back to step 264 for any remaining buffers. After all buffers have been invalidated (or a timeout has occurred), the method proceeds to step 268 to reset the reentry flag (i.e., to false); after this step, the method concludes.

In an exemplary embodiment, a suitable buffer routine may be constructed as follows (in C language):

```
// ...
//
// Following is the clock interrupt routine that
// is executed every 1/18th of a second
//
void __far interrupt RealNewClock( )
{
    ++clockTickCounter;        // Increment 1/18 of a second
    IoUpdateScreen( );         // Screen refresh
    //
    // Check if network access and if 1 second has passed ( 18 ticks )
    // and not in this loop (prevent reentry).
    //
    if (runIsMultiUser && (clockTickCounter % 18) == 0 &&
        !dbInInterrupt) {
        register int i;        // counter variable used for loop
        dbInInterrupt = TRUE;  // prevent re-entry
        //
        // Loop thru all table buffers
        // Decrement time counters.
        //
        for(i = 0; i < dbMaxWorkAreas; i++) {
            if (dbBufferTimeLeft[i] > 0 {
                dbBufferTimeLeft[i] —;    // decrement by 1 second
            }
            else if (dbBufferTimeLeft[i] == 0) {    // time out check
                //
                // A table buffer time counter has decremented to zero.
                // Set flag to indicate that this table's buffers are invalid
                // and need to be re-read.
                //
                dbBufferInvalid[i] = TRUE;
            }
        }
        dbInInterrupt = FALSE;   // finished
    }
}
// ...
```

Figure 2D:
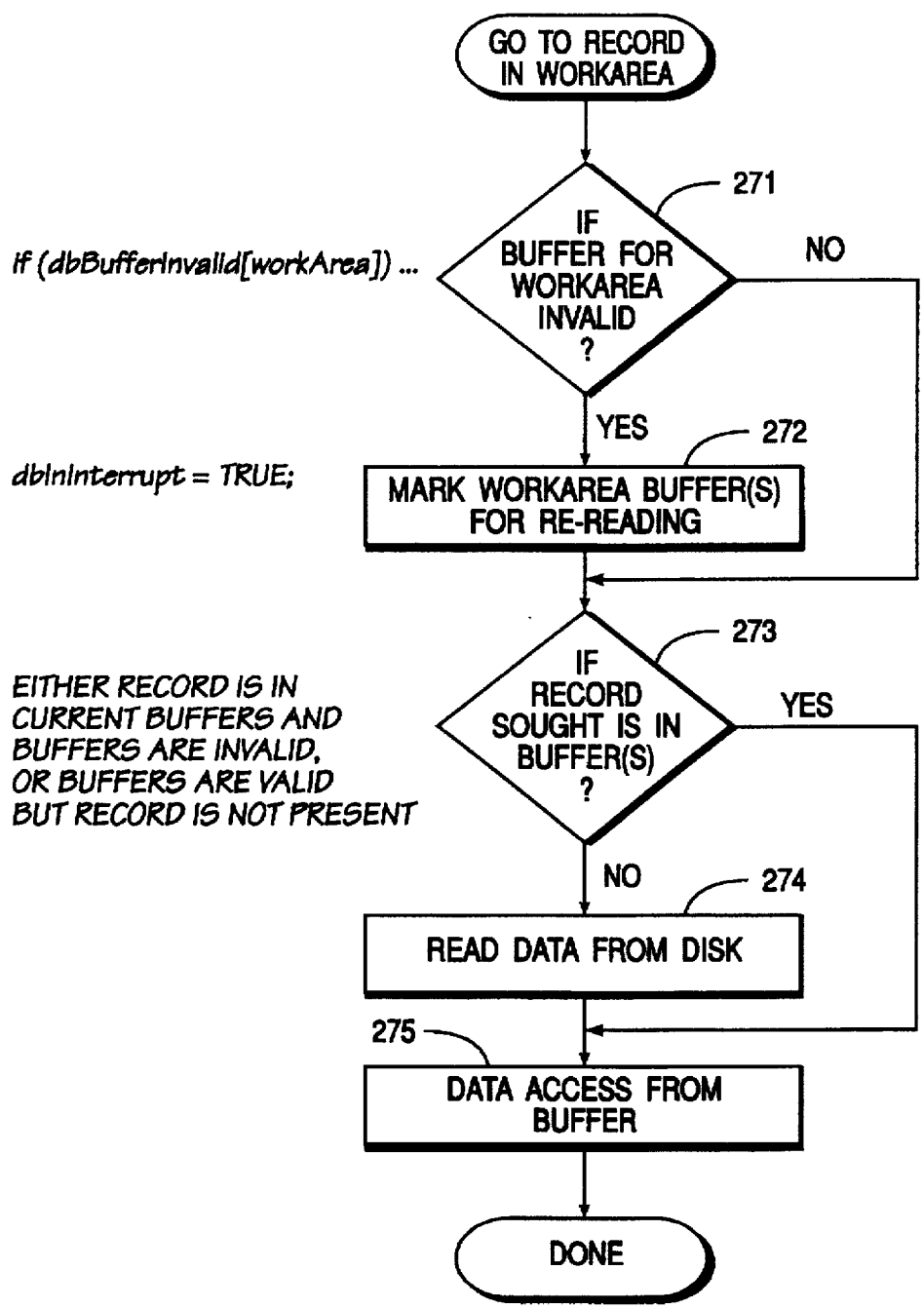
FIG. 2D is a flowchart illustrating a method of the present invention for data access, where the data access required is to "go to" or access a particular data record of interest.

Referring now to FIG. 2D, an exemplary method 270 of the present invention for data access is illustrated. In this example, the data access required is to "go to" or access a particular data record of interest. In dBASE® programming language, for instance, a user or process may issue a command of GOTO 5, for instructing the system to access the fifth record of a table. The method is invoked with a record number of the record of interest and a handle to the workarea (i.e., database table) from which the record is sought.

The method proceeds as follows. At step 271, if the buffer for the record sought (i.e., the buffer for the workarea of the record) has been invalidated, then the method marks the workarea buffer for re-reading at step 272. Otherwise (no at step 271), step 272 is skipped. At step 273, a determination is made as to whether the record is present in the buffer. A record may not be present in the buffer because: (1) the buffer is invalid or (2) the buffer is valid but this particular record has not been read into the buffer. In either case, if the record is not present (yes at step 273), the method proceeds to step 274 to read the record (or records) from storage disk (on the server). If the record is already in the buffer (yes at step 273), however, step 274 may be skipped. Finally, the method may now proceed to access the record from the buffer at step 275.

Again using the C language, a method for providing access to a particular record of interest may be constructed as follows:

mized data access may be employed. As is common in those systems, timing intervals are still available; however, they may not be available on a preemptive (interrupt) basis. In Microsoft Windows, for instance, timing messages are queued, thus complicating the design of real-time processes.

According to the present invention, there is no requirement that the buffer update operations occur at a precise interval. Instead, one need only achieve an "effective frame rate," that is, a rate which meets or exceeds the processing needs of the client. Thus, the actual time interval between any two buffer invalidation operations may vary. Ideally, however, one would select a target interval sufficiently small to compensate for any latency between occurrence of an interval (actual) and receipt of a non-preemptive timer message (apparent). In this fashion, a target time interval may be selected to achieve an effective frame rate which meets or exceeds the needs of the client.

Figure 3:
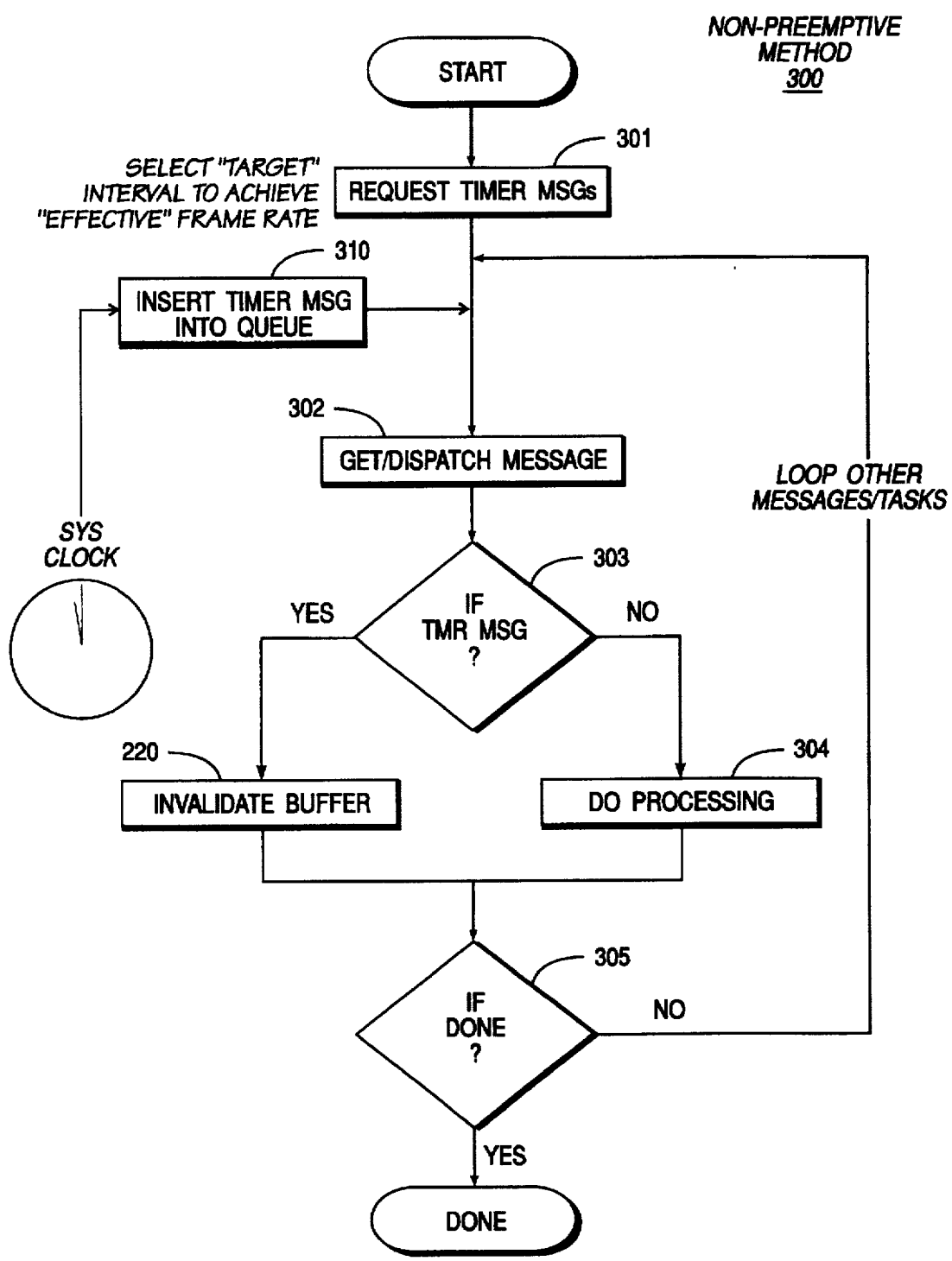
FIG. 3 is a flowchart illustrating steps of refreshing a local memory buffer which occur during a data access method of the present invention operative in a non-preemptive embodiment.

As shown in FIG. 3, the method of this alternative embodiment is summarized by a flowchart 300. In step 301, timer messages are requested from the operating system (e.g., Microsoft Windows), with a target interval selected to

```
// ...
//
// This is a record access routine that
// positions to a specific record in a table buffer
// This occurs when user does any table movement ( e.g., Skipping, Search )
//
void DbGoRec (workArea,recordNumber)
int workArea;
long recordNumber;
{
    if (dbBufferInvalid[workArea]) {          // are buffers invalid?
        DbMarkBuffersForReReading(workArea);  // yes, so mark all buffers
    }
    if (IsRecordInBuffers(workArea,recordNumber)) {
        //
        // Record desired is in current buffer,
        // but current buffer is invalid, so we must re-read.
        //
        // or,
        //
        // Buffers are still valid but record desired is not in
        // current buffers, so must read in buffer from disk.
        //
        DbReadBlock(workArea,recordNumber);   // read from disk
        //
        // Reset time counter.
        //
        dbBufferTimeLeft[workArea] = dbBufferTimeOut;
    }
}
// ...
```

Using the foregoing system and methods of the present invention, the following comparative data access benchmarks have been observed for a PC-based system.

TABLE 2

| Data access operation | Standard | Optimized |
|---|---|---|
| skip 100,000 records | 4:33 (min:sec) | 55 (sec) |
| skip 20,000 indexed records | 2:37 (min:sec) | 22 (sec) |

B. Non-preemptive embodiment

Referring now to FIG. 3, an alternative method of the present invention for optimized data access will be described. In those systems where a periodic interrupt (or functional equivalent) is not readily available, such as Microsoft Windows 3.0, a non-preemptive method for optiachieve an effective frame rate meeting or exceeding the client's processing needs. Next, as illustrated by the flowchart, the message-based, event handling loop of the non-preemptive system is entered. As shown by step 310, appropriate timer messages are placed by the system in the queue of the process, as appropriate. At step 302, any message dispatched to the queue of the process is retrieved and processed. If the specified timer message is retrieved at step 303, the method may undertake the invalidate operation as previously described for step 220. Otherwise (no at step 303), the method does routine event-driven processing, as shown by step 304. As shown conceptually at step 305, the event loop is maintained until a "done" or "quit" message (e.g., Windows' WMQUIT) is received.

Other techniques for accommodating the non-preemptive nature of Windows-type timers are described in the technical literature. See e.g., Petzold, C., *Programming Windows,*

Second Edition, Microsoft Press, 1990 (Chapter 5: The Timer), the disclosure of which is hereby incorporated by reference.

Alternative embodiment

A. Overview

In another embodiment, the present invention provides methods of utilizing information stored locally on a client even after the client has modified data on the server. According to the present invention, a client stores data from the server in one or more local "read-only" buffer(s) to speed up access to the data and reduce network traffic. Since the buffer is treated as "read only," the client need not lock the corresponding data records at the server. Client requests for access to particular records are satisfied from the buffer, providing the client with a "dirty read." The client may proceed to modify desired ones of the data records and post (i.e., "commit") those records to the server. Further at this point, the client updates the local "read-only" buffer(s) with the changes so that the local buffer remains valid. Additionally, the client may update any other local data structures to reflect the changes to the data on the server. By combining "dirty read" methodology with "write-through" updating of the local buffer and local data structures to reflect the changes posted to the data on the server, the present invention provides improved system performance. Client no longer need re-read record blocks or recompute associated data structures.

B. Components

For illustration purposes, the present invention will now be described in reference to a database environment with one or more shared database tables resident at a server. In a preferred embodiment, the server is a file server storing record-oriented database tables (e.g., dBASE tables or Fox Pro tables). However, the present invention is not limited to only such database tables and may be applied to other shared data and in other environments. Therefore, the following description is for illustration, not limitation.

Figure 4:
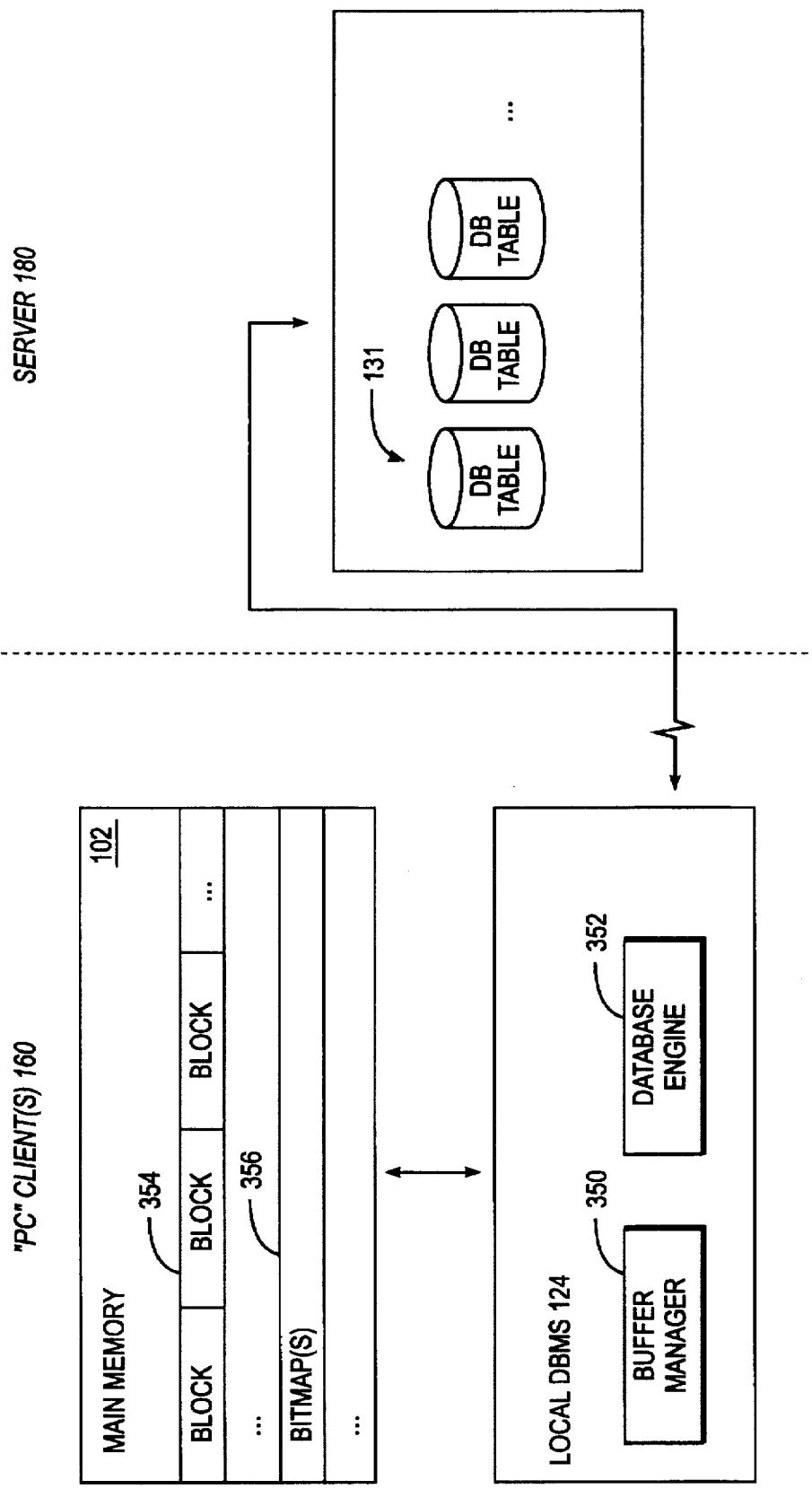
FIG. 4 is a block diagram of the relationship of information stored on a server, the local Database Management System (DBMS) and the local memory of the client.

FIG. 4 illustrates a database environment of the present invention, including the server 180 storing table(s) 131 connected to one or more client(s) 160, each client having a local DBMS 124 and a main memory 102. The table 131 is stored on the server in a fast access, mass storage device (e.g., mass storage 183). In a preferred embodiment, the database table 131 is in the form of a dBASE .dbf database table.

As shown, DBMS 124 includes a Buffer manager 350 and a Database Engine 352. The Database Engine is the part of the DBMS that executes the database operations requested by the user (e.g., find record). More particularly, the Database Engine of the present invention includes standard database functionality, including getting the current record, modifying the current record, moving to another record, locking the record, unlocking the record, setting a filter, and dropping a filter. The filter itself may be implemented as a bit mask or "filter bit map," in a conventional manner. The filter bit map is used in a database operation to filter records such that only the records having a bit set to a particular state in the bit map are utilized.

Typically, the server stores a database table in multiple blocks of uniform size (e.g., 2K blocks). The database table may contain a header that includes housekeeping information. For instance, the header may include a modification count that is incremented each time the database table is modified. Additionally, the table stores records sequentially in blocks. Each block may contain one or more records. As is common in paged architectures, information is sent between networked computers in blocks.

The Buffer Manager allocates and manages blocks of memory on the client that correspond to blocks loaded from the server. In other words, the Buffer Manager caches a local copy of certain blocks on the server. In operation, requests of the Database Engine for particular data records can often (if not always) be satisfied by the local memory buffer, thereby avoiding a slow network access. Although this ideal situation is not always achieved, the Buffer Manager increases overall performance by providing local access to blocks of data records.

In an exemplary embodiment, the Buffer Manager stores local copies of server blocks in main memory 102. As shown, blocks 354 may be stored sequentially in main memory. As the Buffer Manager brings in a new block from the server, the Buffer Manager may employ conventional cache management technique for determining which block to overwrite, using standard LRU or "Least Recently Used" methodology, for instance. The buffered blocks are maintained as "read-only" and may be deemed "stale" by a number of methods. In a preferred embodiment, the blocks are marked as invalid at a periodic interval as described previously.

Also shown in main memory is a bit map(s) 356. As previously described, the bit map or bitmask is a data structure that may be stored in the client's local memory to improve the performance of database operations. Additionally, indices may be stored locally in the main memory of the client.

C. Database Engine operation

Methods of the present invention for cache management which optimize access to shared data will now be described. The methods are implemented in the Borland® Database Engine. The engine itself together with detailed documentation describing operation of the engine is available directly from Borland International of Scotts Valley, Calif., Part No. SDE1120WW21770. The following description will focus on aspects of the engine necessary to understand the present invention.

The engine employs the notion of a "virtual table." The general approach is one where a table is basically treated as an object having methods defined on it. Methods for a table object include, for instance, GoPrevious, GoNext, GoTop, GoBottom, SetFilter, and the like. Of particular interest to the present invention are methods relating to locking of records.

A virtual table, which at one level may be thought of as a traditional "cursor," owns a "logical table". A logical table is a lower-level version of the table represented by the virtual table. The virtual table also owns the underlying physical table; this typically includes the actual data (disk file) stored in a vendor-specific format (e.g., dBASE .dbf file) on a storage device. A physical table object is defined for each physical table; the object knows very basic functionality for the physical table, such as scanning itself in natural order.

The physical table object has no notion of an index or other logical ordering of its data, however. The logical table object, on the other hand, does include methods for processing indexes on tables. In essence, the physical table is abstracted into a logical table object. In a corresponding manner, any physical index (which may or may not be present, according to the particular database table vendor) is abstracted up to a logical index. The logical table and logical index are combined to provide the virtual table object.

As a result, methods of the virtual table which pertain to the combination of a logical table with a logical index (e.g., SetOrderTo method) do not necessarily operate at the level of the physical table. Instead, they are processed at the level of the virtual table which maps the functionality into the appropriate steps depending on the particular DBMS vendor whose tables are being employed.

D. "Fixing" and "Unfixing" records

Records whose field values are to be modified must be "fixed"—that is, read into memory. Fixing is, therefore, the task of locating a particular record (if not already done) and making sure it exists in memory for some operation; it guarantees that the record is in memory. Complementing this is the notion of "unfixing" a record. This is simply removing the requirement that the record be fixed in memory. For instance, after all changes have been made to a record, it may be unfixed as it no longer need be in memory.

Not all record operations require records to be fixed, however. Consider, for instance; the task of moving from one record to another, such as with the dBASE SKIP and GOTO commands:

GOTO TOP

SKIP 5

Here, the system is not concerned about whether the corresponding records exist in memory—that is, whether they are "fixed." If the user has not requested the data at this time, then there is no need for the system to actually retrieve the record into memory. The system maintains the currency of which record the user is currently on (i.e., the current cursor position) without actually doing anything to the record itself. Simple cursor positioning operations, therefore, do not require that the record actually be in memory.

E. Design considerations with "fixing" and "unfixing" records

The task of fixing a record deals specifically with how a record is read from a storage device or network. This task, which includes actually loading a record, falls to a Buffer Manager. It includes functionality for going out to disk and reading a particular record into memory.

Actual approaches to fixing records depend on, in part, where the particular physical records (i.e., physical table) resides. If the physical table resides locally (i.e., not shared), the task is simple. The system simply fixes the record by attempting to page in (i.e., retrieve into memory) that portion of the database table (e.g., block or "page") which contains the record, as well as other records of the block. The method is able to assume that much of the information is cached and can, thus, operate relatively faster. Since a high degree of related records will be cached (i.e., contained within the block), retrieval of other records is improved as these records will often already exist in memory (from a prior-read block).

If the physical table resides on a network (i.e., is shared among multiple users), on the other hand, the task is far more complex. One approach is to read the desired record and only that record. Another approach is to read the page (block) which includes that record as well as other records. With the former approach, the advantages of caching multiple records is not realized. With the latter approach, a problem arises as to how that block, once modified, is written back out. Although one approach is to simply write back out the entire block, this is generally undesirable. Updating multiple records (i.e., an entire block) simply to post a change to a single record is not tolerated well in a multi-user environment.

The task of unfixing a record deals specifically with how a record is written back out to the storage device or network after it has been modified. As in the case of fixing records, the specific steps adopted for writing out a record depends on where the physical table resides. For a non-shared local table (or a network table to which the user has exclusive access), when a record is written to disk, it is not immediately written out to the storage device. Instead, the record buffer block or page containing the record is simply marked "dirty". At a convenient time in the future, the block manager will flush (write) that block out to disk.

If instead the table is a shared network table, the foregoing approach does not suffice. In a multi-user environment employing record locking, it is typically the rule that a change will be committed (written) before the lock is lifted by the lock holder. This requires a system, in such an environment, to write the record immediately. In a preferred embodiment, this is performed by the unfix method.

F. Implementing methods for "fixing" and "unfixing" records

The Buffer Manager is provided with new methods for "fixing" and "unfixing" records in accordance with the present invention. When reading a record from a network, the following approach is adopted. When access is required to a record, the system attempts to ensure that the record is in the Buffer Manager (i.e., in memory), if possible. This is done by pretending that the database is a read-only database (or that the user somehow has exclusive access to it). The system can then page in blocks of records and keep them in a memory buffer or cache. A tradeoff occurs in that certain records may have in fact changed, from the time when the block is read and the time that the particular record is accessed in memory. As previously described above, however, the system can employ a timer for invalidating the buffer when it is older than a certain (pre-selected) amount of time, thus marking the records stale. Thus the approach is, at this particular point, one of the previously-described "dirty read."

It is desirable to be able to "write-through" changes to disk—that is, write changes at the same time the foregoing record cache is maintained in memory. The particular steps for doing this are provided by a UnfixNetRec method of the present invention. In an exemplary environment, the UnfixNetRec method may be constructed (using the C programming language) as follows:

```
1:   DBIResult METHOD
2:   XbPtUnfixNetRec ( pPTable p, RECChange recChange )
3:   {
4:      INT32       lPhysicalOffset, pos;
5:      UINT16      numWritten ;
6:      BLKNUM      blk;
7:      UINT16      iOff;
8:      DBIResult   iErr;
9:      CHAR        *pBuf;
10:     UINT16      cInBuf;
11:     BUFINDEX    bufIndex;
12:     UINT16      iInFirstBuf;
```

-continued

```
13:
14:
15:
16:     ASSERT_LOCKED( );
17:     ASSERT(p—>fFixed == TRUE,
18:             "XbPtUnFix, Attempt to unfix with no prior fix." );
19:
20:     if( recChange != recNOCHANGE )
21:     {
22:       if (p—>hdr.cDbEncode)
23:       {
24:         // encrypt record buffer
25:         XbUtilEncrypt (p—>pvRecBuf, p—>hdr.iRecSize,
26:             p—>aiGroupKey);
27:       }
28:       p—>fUpdated = TRUE;
29:       p—>pub.iUpdateCnt++;   //Inc Update counter
30:       lPhysicalOffset = (p=>lFixedRec-1) *p—>hdr.iRecSize
31:             + p—>hdr.iHdrSize;
32:       //Write the record out
33:       iErr = (OsSeek(p—>hFile, lPhysicalOffset, 0, &pos)) | |
34:             (OsWrite(p—>hFile, p—>pvRecBuf, p—>hdr.iRecSize,
35:             &numWritten)) | | (numWritten != p—>hdr.iRecSize) ;
36:
37:       if (iErr)
38:       {
39:         p—>pub.bDeviceErr = TRUE ;
40:         OsClearError ( ) ;
41:         OsSaveErrorByLang (DBIMOD_DBASEDRV, DBIERR_WRITERR,
42:             DBISYM_FILENAME, p—>pub.tpp.szFileName, NULL) ;
43:         return DBIERR_WRITEERR ;
44:       }
45:
46:       if (p—>bHdrUpdated)
47:       {
48:         p—>pub.bDeviceErr = TRUE ;
49:         if (iErr)
50:         {
51:           p—>pub.bDeviceErr = TRUE ;
52:           osClearError ( );
53:           OsSaveErrorByLang (DBIMOD_DBASEDRV, DBIERR_WRITEERR,
54:             DBISYM_FILENAME, p—>pub.tpp.szFileName, NULL) ;
55:           return DBIERR_WRITEER ;
56:         }
57:
58:         p—>bHdrUpdated = FALSE ;
59:       }
60:
61:       // update buffer manager if block is there
62:       blk = (lPhysicalOffset / p—>iBlockSize) + 1L;
63:       iOff = (UINT16) (lPhysicalOffset % p—>iBlockSize);
64:       iInFirstBuf = p—>iBlockSize - iOff;
65:
66:       // at most two blocks
67:       bufIndex = SwIsInBm (p—>hBuffMgr, blk);
68:
69:       if (bufIndex != 0)
70:       {
71:         iErr=SwBlkSeek(p—>hBuffMgr,blk,&bufIndex, (PVOID*) &pBuf, TRUE);
72:         if (iErr)
73:         {
74:           p—>pub.bDeviceErr = TRUE ;
75:           OsClearError ( );
76:           OsSaveErrorByLang (DBIMOD_DBASEDRV, DBIERR_WRITEERR,
77:             DBISYM_FILENAME, p—>pub.tpp.szFileName, NULL) ;
78:           return DBIERR_WRITEERR ;
79:         }
80:
81:         // if record fit in first block. . .
82:         if (iInFirstBuf >= p—>hdr.iRecSize) {
83:           CopyMem((PVOID) (((PUCH)pBuf) +iOff),p—>pvRecBuf,
84:             p—>hdr.iRecSize);
85:           SwBlkUnfix (bufIndex);
86:         }
87:         else {
88:           CopyMem ((PVOID) (((PUCH)pBuf) +iOff),
89:             p—>pvRecBuf, iInFirstBuf);
90:           swBlkUnfix (bufIndex);
91:         }
92:       }
```

```
93:
94:         // if record didn't fit in 1st block, check the next block
95:         if (iInFirstBuf < p—>hdr.iRecSize)
96:         {
97:             blk++;
98:             bufIndex = SwIsInBm (p—> hBuffMgr, blk);
99:
100:            if (bufIndex != 0) {
101:                iErr = SwBlkSeek (p—>hBuffMgr, blk,
102:                    &bufIndex, (PVOID*) &pBuf, TRUE);
103:                if (iErr)
104:                {
105:                    p—>pub.bDeviceErr = TRUE ;
106:                    OsClearError ( ) ;
107:                    OsSaveErrorByLang (DBIMOD_DBASEDRV, DBIERR_WRITEERR,
108:                        DBISYM_FILENAME, p—>pub.tpp.szFileName, NULL) ;
109:                    return DBIERR_WRITEERR ;
110:                }
111:
112:                CopyMem (pBuf, (PVOID) (((PUCH) p—>pvRecBuf) +iInFirstBuf),
113:                    p—>hdr.iRecSize-iInFirstBuf);
114:                SwBlkUnfix (bufIndex);
115:            }
116:        }
117:    }
118:
119:    p—>fFixed = FALSE;
120:    return DBIERR_NONE;
121:
122:    } //XbPtUnfixNetRec ( )
```

As shown, the method is invoked with two parameters. The first parameter, pPTable, is a pointer to the object, here the physical table. The pPTable (pointer) is, in effect, the physical table description (similar to a "cursor"). The second parameter is a Record Change (RECChange) data structure. This is a descriptor of the record change, including information about the record buffer.

The steps of the method are as follows. First, the method tests whether the record has changed (line 20). In the event of a change (i.e., the condition holds true), the method proceeds as follows. The record buffer is encrypted (lines 22-27) if the table is password-protected (as previously specified by the user). At line 28, the update flag for the pPTable is set to true, indicating that the table has changed. In conjunction with this, an update counter is incremented (line 29). Then at lines 30-31, the record's offset into the file is calculated (here, shown for a dBASE-specific implementation).

At lines 32-35, the method writes the record out to file. Lines 37-44 check to see if an error occurred (for possibly invoking error handling routines). At line 46, the method tests whether the header to the file has been updated, by testing a "header updated" flag. If the header has been updated (true at line 46), the method rewrites the header at line 48 and tests for any occurring error (lines 49-56). Finally, the header updated flag is reset (i.e., set equal to false).

Next, the method fixes up the Buffer Manager. In particular, the Buffer Manager block is updated (if it is in fact still there in memory). This is done as follows. The method determines the particular block, including block number and offset, at lines 61-64. At line 67, the method determines whether the block currently exists in the block manager, by invoking a subroutine, SwIsInBm. The subroutine is invoked with a handle to the Buffer Manager (hBuffMgr) and an ID for the particular block (blk). The routine returns a number indicating whether the block is in the buffer.

If the block is in the Buffer Manager (true at line 69), the method proceeds as follows. The method first asks for access to the block as it resides in the Buffer Manager, at line 71. This is done by seeking to the offset of the block and, in effect, locking the block (so the Buffer Manager does not page it out at this point). At lines 72-79, the method tests for an error condition and, when appropriate, invokes an exception handling routine.

At lines 81-91, the method determines whether the record fits in the blocks (which were requested to be paged in) and, if so, simply copies the information into (the location of) the blocks. As shown, the actual implementation attempts to first copy the record into a first block and, if necessary, copies the remainder into a second block. After the information is copied to the block (or blocks if necessary), the "pinned" or fixed block is unpinned. Lines 94-116 simply copy any remainder (i.e., left over from the first block) into a second block, as necessary. Finally, the method resets a "fixed" flag by setting it equal to false, at line 119, and then simply returns at line 120.

The functionality of the method can be summarized as follows. The buffer is "read-only"; it is not used to write changes which would be posted back to the server. Any time a write operation occurs, it is written through to disk (e.g., by the OSWrite call at line 34). The record buffer is updated, not from disk, but by simply updating the particular record (or set of records) which have changed locally. In other words, any reader of the buffer will read the buffer as it was originally read from disk plus the one record (or records) which was changed.

A method for getting a particular record (e.g., by record number) on a network, GetNetRec may be constructed as follows (in the C programming language):

```
1:   DBIResult METHOD
2:   XbPtGetNetRec ( pPTable p, INT32 lRecNo, CHAR **rslt )
3:   {
4:       DBIResult    iErr ;
5:       UINT16       numRead ;
6:       INT32        lPhysicalOffset, pos;
7:       INT32        iNewElapsed;
8:       BLKNUM       blk;
9:       CHAR         *pBuf;
10:      UINT16       cInBuf;
11:      UINT16       iOff;
12:
13       ASSERT_LOCKED ( );
14:      ASSER( p—>fFixed == FALSE,
15:      "XbPtFixNetRec ( ), Attempting to Fix before a call to UNFIX." );
16:
17:      ASSERT ( (lRecNo != 0L && lRecNo != 0x7FFFFF00L),
18:                "XbPtFixNetRec ( ), At BOF or EOF");
19:
20:      if (p—>pub.bDeviceErr)
21:          return DBIERR_ACCESSDISABLED ;
22:
23:      if (p—>pub.iCbLock)
24:          return DBIERR_FILEBUSY ;
25:
26:      iNewElapsed = OsGetSystemTicks ( );
27:      if ((iNewElapsed – p—>iElapsed) > XBMAXDATAAGE)
28:          {
29:          p—>iElapsed = iNewElapsed;
30:          SWForget (p—>hBuffMgr); // clear buffer every XBMAXDATAAGE ms
31:          }
32:
33:      if (p —>lFixedRec == lRecNo && p—>lFixedBlk != 0L)
34:          {
35:          blk = p—>lFixedBlk ;
36:          iOff = p—>iFixedOffset ;
37:          }
38:      else
39:          {
40:          if (lRecNo != 1L && lRecNo == p—>lFixedRec+1)
41:              {
42:              //Enable Seq Access for Buffer manager
43:              p—>pub.ptpub.bEnableSeqRead = TRUE ;
44:              p—>pub.ptpub.bEnableSeqWrite = TRUE ;
45:
46:              if ( p—>lFixedBlk != 0L && (p—>iFixedOffset
47:                      += p—>hdr.iRecSize) < p—>iBlockSize ) {
48:              //Offset already computed
49:              iOff = p—>iFixedOffset ;
50:              blk = p—>lFixedBlk ;
51:              }
52:          else
53:              blk = 0L ;
54:          }
55:      else
56:          {
57:          //Disable Seq Access in Buffer Manager
58:          p—>pub/ptpub.bEnableSeqRead = FALSE ;
59:          p—>pub.ptpub.bEnableSeqWrite = FALSE ;
60:          blk = 0L ;
61:          }
62:
63:      if (blk == 0L)
64:          {
65:          //— Calculate the physical byte offset of record start
66:
67:          lPhysicalOffset= lRecNo-1) *p—>hdr.iRecSize+p—>hdr.iHdrSize;
68:
69:          //— calc the block number and the offset
70:          //      within the block of the record.
71:
72:          blk = (lPhysicalOffset / p—>iBlockSize) + 1;
73:          iOff = (UINT16) (lPhysicalOffset % p—>iBlockSize);
74:
75:          p—>lFixedBlk = blk;
76:          p—>iFixedOffset = iOff;
77:          }
78:
79:      p—>lFixedRec = lRecNo;
80:      }
```

-continued

```
 81:
 82:
 83:    //— get the block.
 84:    ASSERT ((blk <= p—>lMaxBlk),
 85:       "Cannot use GetRec ( ) to grow PTable");
 86:    iErr = SwBlkSeek (p—>hBuffMgr, blk, &p—>bufIndex,
 87:         (PVOID*) &pBuf, FALSE);
 88:    if (iErr)
 89:       return iErr ;
 90:
 91:    cInBuf = p—>iBlockSize − iOff;
 92:    if( cInBuf >= p—>hdr.iRecSize && !p—>hdr.cDbEncode)
 93:       {
 94:       p—>fCopy = FALSE;
 95:       *rslt =(PVOID) (((PUCH)pBuf) +iOff);
 96:       }
 97:    else
 98:       if (cInBuf >= p—>hdr.iRecSize)      // encrypted
 99:          CopyMem (p—>pvRecBuf, (PVOID) (((PUCH)pBuf) +iOff),
100:             p—>hdr.iRecSize);
101:       else
102:          {
103:          CopyMem ( p—>pvRecBuf, (PVOID) (((PUCH)pBuf) +iOff),cInBuf );
104:
105:          blk++;
106:
107:          iErr = SwBlkSeek(p—>hBuffMgr, blk, &p—>bufIndex,
108:             (PVOID*) &pBuf, FALSE);
109:          if (iErr)
110:             return iErr ;
111:
112:          CopyMem( (PVOID) (((PUCH) (p—>pvRecBuf) +cInBuf)), pBuf,
113:                p—>hdr.iRecSize-cInBuf );
114:          }
115:       p—>fCopy = TRUE;
116:       *rslt = p—>pvRecBuf;
117:
118:       if (p—>hdr.cDbEncode ) {
119:          XbUtilDecrypt (p—>pvRecBuf, p—>hdr.iRecSize,
120:             p—>aiGroupKey);
121:          }
122:    }
123:
124:    return DBIERR_NONE;
125:
126:    } //XbPtGetNetRec ( )
```

As shown, the method is invoked with a pointer to the physical table (pPTable) and a record number (lRecNo) for the actual record to get. As a third parameter, pointer-to-a-pointer data member is passed for storing a result.

The particular steps of the method are as follows. After some initialization and housekeeping, the method at lines 26–27 tests whether a predefined interval of time has elapsed. If so (true at line 27), the method proceeds to reset the time count (line 29) and "forget" the buffer—clear out the buffer.

As an optimization, the method tests whether the record sought is the same as the record currently fixed, at line 33. If so, it can simply set the block and offset to that already determined for the fixed block. This is useful for operations which repeatedly operate on the same record. Otherwise, the method at lines 40–80 performs optimization for enabling sequential read and write. Regardless of which optimization is employed, the end result is that the block number of the record and the offset within that block is calculated.

Next, the method gets the block. This is done at line 86, with a call to SwBlkSeek. When this request is made for the Buffer Manager to seek a block, if the block is already in memory, the Buffer Manager will simply locate it (as it knows where it is) and return a pointer to it. If, on the other hand, it is not in memory, the Buffer Manager will load it. The block will not be in memory if it was "forgotten" (recall, at line 30). In other words, the method is forced to re-read the block if it is stale. Lines 88–89 tests for the occurrence of an error; it will return an error code, if necessary.

At line 91, the method determines whether the buffer spans two blocks; the information will be used for encryption/decryption purposes. Then, the method computes a pointer to the record, from the block plus the offset (line 95). The result pointer (*rslt) is set to this value. Lines 97–122 perform the same functionality except that the block is encrypted. Therefore, at this point, the information is copied into the record buffer and a decryption method is applied. No particular encryption/decryption methodology is required for implementing the present invention. At the conclusion of these steps, the method returns (line 124).

While the invention is described in some detail with specific reference to a single preferred embodiment and certain alternatives, there is no intent to limit the invention to that particular embodiment or those specific alternatives. For instance, the system 100 may be implemented in other platforms, including Macintosh, Unix, and the like. While the present invention is perhaps best implemented in multi-user systems, those skilled in the art will also appreciate that the present invention may be employed in certain multi-tasking systems as well. Although the system of the present invention requires no dedicated hardware, the described methods may be implemented with a firmware coupled to the system, if desired; moreover, buffer memory may be implemented as a dedicated high-speed memory (e.g., SRAM) located physically separate from the system memory. Thus, the true scope of the present invention is not limited to any one of the foregoing exemplary embodiments but is instead defined by the appended claims.

What is claimed is:

1. In a system comprising a computer network comprising a server for storing information records which may be shared among a plurality of client workstations, each of said client workstations having a processor and a memory, a method for providing a client access to information records stored on the server, the method comprising the steps of:

receiving from a process executing at the client a request for access to particular records stored on the server;

allocating a buffer in the memory of the client, said buffer for storing copies of said particular records;

transferring copies of said particular records from the server into the buffer of the client, said transferring step being performed with shared access to said particular records;

satisfying said request by providing said process access to said copies of said particular records from said buffer;

receiving at the client input for modifying at least one of said particular records;

transferring said modified at least one of said particular records from the client to the server;

updating copies of records in the buffer which correspond to said modified at least one of said particular records so that said step of transferring said modified at least one of said particular records from the client to the server does not render the buffer invalid; and periodically marking the buffer as invalid regardless of whether modifications have been posted from clients to the server, upon expiration of a pre-selected time interval.

2. The method of claim 1, wherein said particular records on the server includes database records stored in at least one record block on the server.

3. The method of claim 2, wherein said step of transferring said modified at least one of said particular records from the client to the server includes transferring said at least one record block to the client.

4. The method of claim 1, further comprising the step of marking the buffer as valid upon completion of said updating step.

5. The method of claim 1, further comprising:

receiving a subsequent request from a process executing at the client for access to records stored on the server; and if the records of the subsequent request are in the buffer, satisfying said request by providing access to said copies of said particular records from said buffer.

6. The method of claim 1, further comprising:

receiving a query condition for selecting particular records;

creating a filter bitmap of those records which meet the query condition; and upon occurrence of said step of transferring said modified at least one of said particular records from the client to the server, updating portions of said bitmap which correspond to said modified at least one of said particular records so that said transfer step does not render the bitmap invalid.

7. The method of claim 6, wherein said step of creating a filter bitmap of those records which meet the query condition comprises setting a bit for each record which meets the query condition and resetting the bit for each record which does not meet the query condition.

8. The method of claim 7, wherein said step of updating portions of said bitmap comprises:

re-applying the query condition to each modified record, and setting a bit for each record which now meets the query condition and resetting the bit for each record which no longer meets the query condition.

9. The method of claim 1, wherein said satisfying step includes:

providing said process executing at the client access to said copies of said particular records from said buffer by copying the records to a region in the memory of the client other than the buffer.

10. A server-based networking system with improved data access, comprising:

a server having a storage device for storing records in blocks;

at least one client operably coupled to said server through a communication line, each said at least one client having a processor and a memory;

means for copying at least one of the blocks from the server into a local buffer in the memory of a client;

means for accessing records from said local buffer;

means, responsive to input at said client, for modifying records which are accessed from said local buffer;

means for posting modified records to said server;

means for determining whether any modified records posted to said server exist in said local buffer;

means for updating copies of records in the local buffer which correspond to said records posted to said server from said client; and means for periodically marking said local buffer as invalid regardless of whether modifications have been posted from clients to the server, upon expiration of a preselected time interval.

11. The system of claim 10, further comprising means for marking the buffer as valid when the buffer is updated.

12. The system of claim 10, further comprising:

means for receiving a query condition for selecting particular records;

means for creating a filter bitmap of those records which meet the query condition; and means for updating portions of said bitmap which correspond to said modified at least one of said particular records so that said transfer step does not render the bitmap invalid, upon occurrence of said step of transferring said modified at least one of said particular records from the client to the server.

13. The system of claim 10, wherein said means for copying at least one of the blocks from the server into a local buffer in the memory of the client includes:

means for copying without exclusive access at least one of the blocks from the server into a local buffer in the memory of the client.

14. A server-based networking system with improved data access comprising:

(a) a server having a storage device;

(b) at least one client operably coupled to said server through a communication line, each said at least one client having a processor and a memory;

(c) means for transferring a valid copy of data from the storage device of the server to memory of a client;

(d) means, responsive to a request for data, for providing access to the valid copy of the data in the memory of the client;

(e) time-based means for periodically marking the copy as invalid regardless of whether modifications have been posted from clients to the server;

(f) modification means for creating a modified copy of the data and posting the modified copy to the server; and (g) update means for updating the copy of the data in the memory of the client, upon posting the modified copy to the server.

15. The system of claim 14, wherein said processor is an Intel® 80×86 class microprocessor and wherein said time-based means includes a real-time clock (RTC) capable of generating preemptive interrupts.

16. The system of claim 15, wherein said time-based means includes means responsive to interrupts from the RTC for transferring a new copy of the data from the storage device of the server to the memory of the client.

17. The system of claim 14, wherein said time interval is empirically selected to optimize data access.

18. The system of claim 14, wherein the time interval is selected from a range of about 1 to 4 seconds.

19. The system of claim 14, wherein the time interval substantially equals about 2 seconds.

* * * * *